United States Patent
Gatland

(10) Patent No.: US 10,754,528 B2
(45) Date of Patent: Aug. 25, 2020

(54) SONAR USER INTERFACE SYSTEMS AND METHODS

(71) Applicant: FLIR Systems, Inc., Wilsonville, OR (US)

(72) Inventor: Christopher Daniel Gatland, Fareham (GB)

(73) Assignee: FLIR SYSTEMS, INC., Wilsonville, OR (US)

( * ) Notice: Subject to any disclaimer, the term of this patent is extended or adjusted under 35 U.S.C. 154(b) by 312 days.

(21) Appl. No.: 15/266,994

(22) Filed: Sep. 15, 2016

(65) Prior Publication Data

US 2017/0003865 A1     Jan. 5, 2017

Related U.S. Application Data

(63) Continuation of application No. PCT/US2015/025615, filed on Apr. 13, 2015.

(Continued)

(51) Int. Cl.
*G06F 3/0484*     (2013.01)
*G06F 3/0481*     (2013.01)
(Continued)

(52) U.S. Cl.
CPC ............ *G06F 3/04847* (2013.01); *G01S 7/56* (2013.01); *G01S 15/89* (2013.01); *G06F 3/0481* (2013.01);
(Continued)

(58) Field of Classification Search
CPC . G01S 15/87; G01S 15/89; G01S 7/56; G06F 3/0481; G06F 3/0482;
(Continued)

(56) References Cited

U.S. PATENT DOCUMENTS 5,537,380 A * 7/1996 Sprankle, Jr. ......... G01S 7/6245
367/105
2007/0277115 A1* 11/2007 Glinsky ................... G01V 1/34
715/771

(Continued)

FOREIGN PATENT DOCUMENTS

GB     2 457 109 A     8/2009

*Primary Examiner* — Jennifer N To
*Assistant Examiner* — Reji Kartholy
(74) *Attorney, Agent, or Firm* — Haynes and Boone, LLP

(57) ABSTRACT

Techniques are disclosed for systems and methods to provide intuitive user interfaces for sonar systems attached to mobile structures. A sonar user interface system includes a logic device configured to communicate with one or more sonar controllers and/or sonar transducer assemblies and associated processing and control electronics and optionally orientation and/or position sensors disposed substantially within the sonar transducer assemblies. Each sonar controller and/or transducer assembly includes channels that can be operated together or independently. Configurations for each channel, transducer assembly, controller, and/or for the entire sonar system are rendered and displayed using a combination of graphical and textual indicators to allow intuitive selection and/or arrangement of system, controller, assembly, and/or channel configurations and to store configurations for recall. Resulting sonar data and/or imagery may be displayed and/or used to adjust various operational systems of the mobile structure.

18 Claims, 14 Drawing Sheets

Related U.S. Application Data

(60) Provisional application No. 61/980,495, filed on Apr. 16, 2014.

(51) Int. Cl.
*G01S 15/87* (2006.01)
*G01S 7/56* (2006.01)
*G01S 15/89* (2006.01)
*G06F 3/0482* (2013.01)
*G06T 11/20* (2006.01)
*G06T 11/60* (2006.01)

(52) U.S. Cl.
CPC .......... *G06F 3/0482* (2013.01); *G06T 11/206* (2013.01); *G06T 11/60* (2013.01); *G01S 15/87* (2013.01); *G06T 2200/24* (2013.01)

(58) Field of Classification Search
CPC .... G06F 3/04847; G06T 11/206; G06T 11/60; G06T 2200/24
See application file for complete search history.

(56) References Cited

U.S. PATENT DOCUMENTS

| | | | |
|---|---|---|---|
| 2012/0274660 A1* | 11/2012 | Okuda | G01S 7/04 345/629 |
| 2013/0215719 A1* | 8/2013 | Betts | G01S 7/521 367/88 |
| 2014/0010049 A1 | 1/2014 | Proctor | |
| 2014/0013270 A1 | 1/2014 | Thomas et al. | |
| 2014/0013272 A1* | 1/2014 | Thomas | G06F 3/04842 715/800 |
| 2014/0013276 A1 | 1/2014 | Butterworth | |
| 2017/0184415 A1* | 6/2017 | Vitali | H03M 1/12 |

* cited by examiner

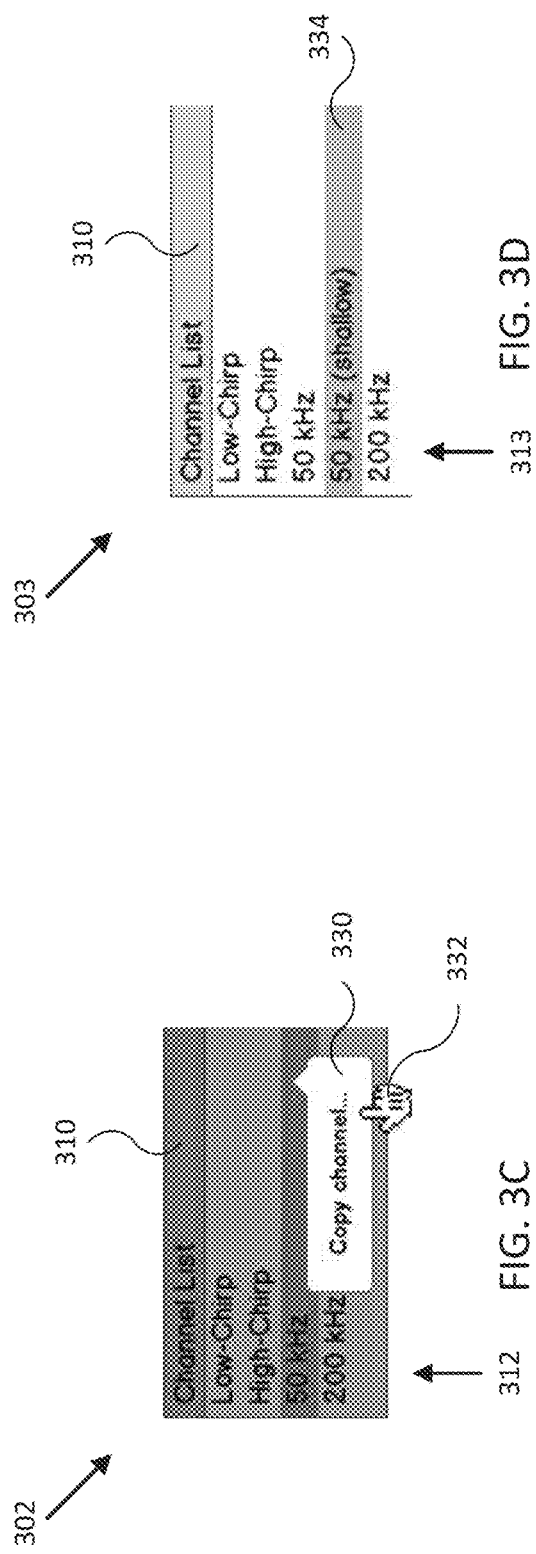
FIG. 3C
FIG. 3D
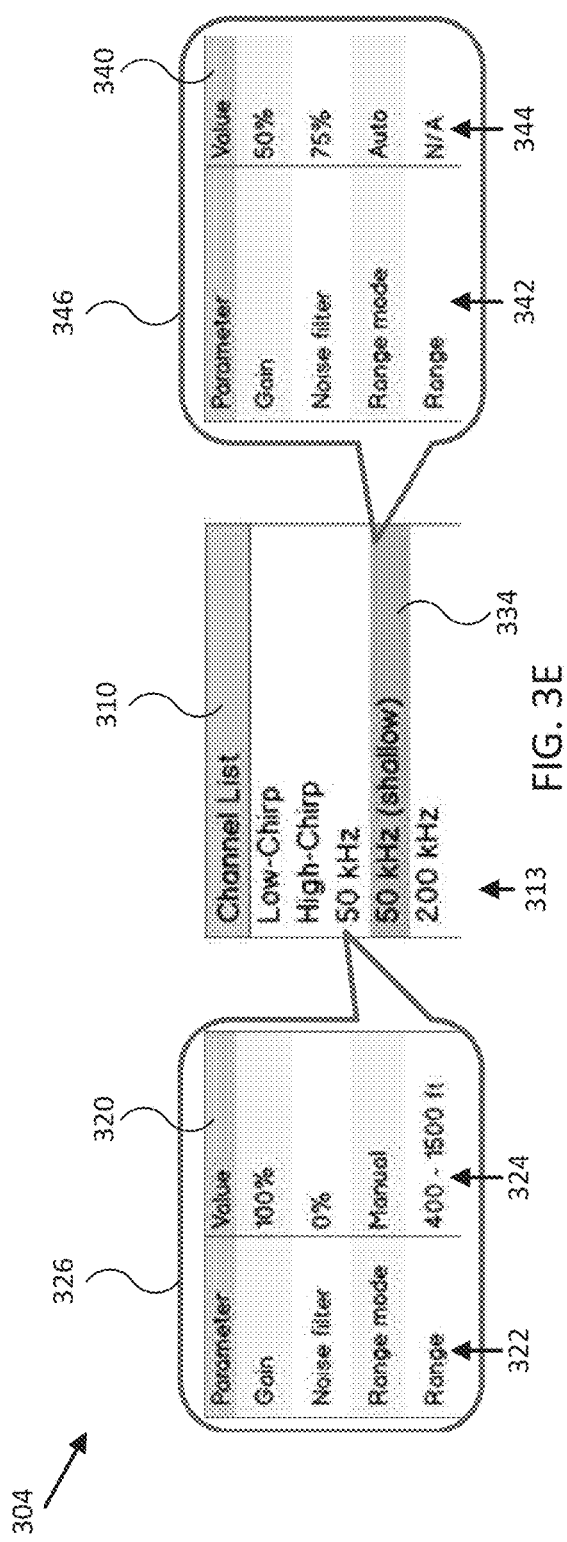
FIG. 3E

SONAR USER INTERFACE SYSTEMS AND METHODS

CROSS-REFERENCE TO RELATED APPLICATIONS

This patent application is a continuation of International Patent Application No. PCT/US2015/025615, filed Apr. 13, 2015 and entitled "SONAR USER INTERFACE SYSTEMS AND METHODS," which claims priority to and the benefit of U.S. Provisional Patent Application No. 61/980,495, filed Apr. 16, 2014 and entitled "SONAR USER INTERFACE SYSTEMS AND METHODS," all of which are hereby incorporated by reference in their entirety.

TECHNICAL FIELD

One or more embodiments of the invention relate generally to sonar systems and more particularly, for example, to systems and methods for providing user interfaces for sonar systems.

BACKGROUND

Sonar may be used to perform a number of functions important to travel over or through water, such as to perform bathymetry, detect underwater hazards, find fish, and/or otherwise assist in navigation by producing data and/or imagery of a water column beneath a watercraft. Conventional sonar systems often include one or two independently operated sonar transducers with their own user interfaces arranged to produce traditionally recognizable sonar imagery.

Typical user interfaces for such systems are often very complex and non-intuitive to set up and operate and therefore can be difficult and time consuming to use in a conventional manner. Moreover, setup and operation of systems with multiple sonar transducers is often further complicated when the multiple sonar transducers are meant to be used substantially at the same time. For example, multiple sonar transducers coupled to the same mobile structure can be used to provide enhanced sonar imagery (e.g., increased breadth of coverage, increased image detail, and/or other types of sonar imagery enhancements) in relation to the mobile structure. Changing configurations of such systems while operating can require substantial down time while the new configuration is implemented, and the down time can result in lost productivity and/or decreased safety. Thus, there is a need for an improved methodology to provide intuitive sonar system user interfaces, particularly in the context of setup and configuration of sonar systems with multiple sonar transducers and/or configurations and providing relatively high quality enhanced sonar data and/or imagery in relation to a mobile structure.

SUMMARY

Techniques are disclosed for systems and methods to provide intuitive user interfaces for sonar systems attached to mobile structures. A sonar user interface system may include a logic device in communication with one or more sonar controllers and/or sonar transducer assemblies and associated processing and control electronics and optionally orientation and/or position sensors disposed substantially within the sonar transducer assemblies. Each sonar controller and/or sonar transducer assembly may include one or more channels that can be operated together or independently. Configurations for each channel, sonar transducer assembly, sonar controller, and/or for the entire sonar system may be rendered and displayed to a user using a combination of graphical and textual indicators to allow intuitive selection and/or arrangement of system, controller, assembly, and/or channel configurations and to store such configurations for substantially instantaneous recall. Resulting sonar data and/or imagery may be displayed to a user and/or used to adjust various operational systems of the mobile structure.

In various embodiments, a sonar user interface system may include an orientation sensor, a position sensor, a gyroscope, an accelerometer, and/or one or more additional sensors, actuators, controllers, user interfaces, mapping systems, and/or other modules mounted to or in proximity to a vehicle. Each component of the system may be implemented with a logic device adapted to form one or more wired and/or wireless communication links for transmitting and/or receiving sensor signals, control signals, or other signals and/or data between the various components.

In one embodiment, a system may include a logic device configured to receive one or more sensor signals and render a sonar user interface for a sonar system coupled to a mobile structure. The logic device may be adapted to render a channel list window comprising a channel list for a sounder of the sonar system; receive user input selecting an item in the channel list; and render a selector graphic in the channel list window corresponding to the selected channel list item, where the selector graphic may be configured to indicate a channel of the sounder for operation and/or for configuration by the sonar user interface.

In another embodiment, a method may include rendering a channel list window comprising a channel list for a sounder of a sonar system; receiving user input selecting an item in the channel list; and rendering a selector graphic in the channel list window corresponding to the selected channel list item, where the selector graphic may be configured to indicate a channel of the sounder for operation and/or for configuration by a sonar user interface.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 3A-E illustrate various display views of a sonar user interface in accordance with embodiments of the disclosure.

Embodiments of the invention and their advantages are best understood by referring to the detailed description that follows. It should be appreciated that like reference numerals are used to identify like elements illustrated in one or more of the figures.

DETAILED DESCRIPTION

In accordance with various embodiments of the present disclosure, sonar user interface systems and methods may advantageously include a controller, a display, and one or more sonar transducer assemblies in conjunction with an orientation sensor, a gyroscope, an accelerometer, a position sensor, and/or a speed sensor providing measurements of an orientation, a position, an acceleration, and/or a speed of the sonar transducer assemblies and/or a coupled mobile structure. For example, the sensors may be mounted to or within the mobile structure (e.g., a watercraft, aircraft, motor vehicle, and/or other mobile structure), or may be integrated with the sonar transducer assemblies, the user interface, and/or the controller.

Embodiments of the present disclosure can be easier to use than conventional systems and/or methods through use of intuitive user interface display and selection techniques, as described herein. Moreover, such embodiments may be used to control a number of unique sonar transducer assembly arrangements. The unique sonar transducer assembly arrangements, in turn, provide various opportunities to develop new sonar processing and/or data accumulation techniques, as described herein.

Figure 1A:
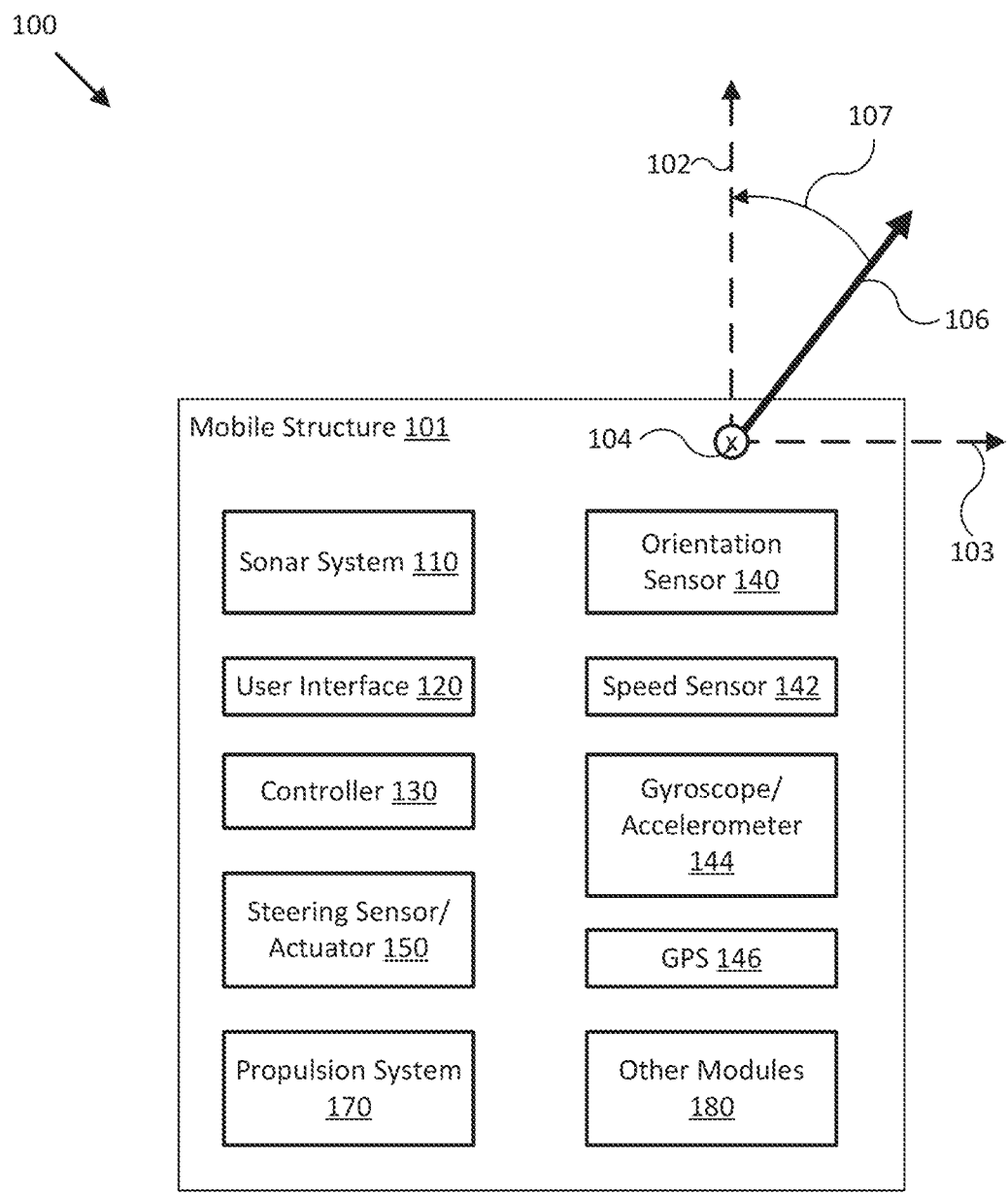
FIG. 1A illustrates a block diagram of a sonar user interface system in accordance with an embodiment of the disclosure.

FIG. 1A illustrates a block diagram of sonar user interface system 100 in accordance with an embodiment of the disclosure. In various embodiments, system 100 may be adapted to provide a sonar user interface using user interface 120 for accepting user input in relation to configuration of sonar system 110. In some embodiments, system 100 may be adapted to measure an orientation, a position, an acceleration, and a speed of mobile structure 101 and/or sonar system 110. System 100 may use such configurations and/or measurements to form various views of sonar data provided by sonar system 110 and/or to adjust an orientation of sonar system 110 according to a desired operation of sonar system 110 and/or mobile structure 101. In some embodiments, system 100 may display resulting sonar data and/or imagery to a user through user interface 120, and/or use the sonar data and/or imagery to control operation of mobile structure 101, such as controlling steering actuator 150 and/or propulsion system 170 to steer mobile structure 101 according to a desired heading, such as heading angle 107, for example.

In the embodiment shown in FIG. 1A, system 100 may be implemented to provide sonar data and/or imagery for a particular type of mobile structure 101, such as a drone, a watercraft, an aircraft, a robot, a vehicle, and/or other types of mobile structures. In one embodiment, system 100 may include one or more of a sonar system 110, a user interface 120, a controller 130, an orientation sensor 140, a speed sensor 142, a gyroscope/accelerometer 144, a global positioning satellite system (GPS) 146, a steering sensor/actuator 150, a propulsion system 170, and one or more other sensors and/or actuators, such as other modules 180. In some embodiments, one or more of the elements of system 100 may be implemented in a combined housing or structure that can be coupled to mobile structure 101 and/or held or carried by a user of mobile structure 101.

Directions 102, 103, and 104 describe one possible coordinate frame of mobile structure 101 (e.g., for headings or orientations measured by orientation sensor 140 and/or angular velocities and accelerations measured by gyroscope 144 and accelerometer 145). As shown in FIG. 1A, direction 102 illustrates a direction that may be substantially parallel to and/or aligned with a longitudinal axis of mobile structure 101, direction 103 illustrates a direction that may be substantially parallel to and/or aligned with a lateral axis of mobile structure 101, and direction 104 illustrates a direction that may be substantially parallel to and/or aligned with a vertical axis of mobile structure 101, as described herein. For example, a roll component of motion of mobile structure 101 may correspond to rotations around direction 102, a pitch component may correspond to rotations around direction 103, and a yaw component may correspond to rotations around direction 104.

Heading angle 107 may correspond to the angle between a projection of a reference direction 106 (e.g., the local component of the Earth's magnetic field) onto a horizontal plane (e.g., referenced to a gravitationally defined "down" vector local to mobile structure 101) and a projection of direction 102 onto the same horizontal plane. In some embodiments, the projection of reference direction 106 onto a horizontal plane (e.g., referenced to a gravitationally defined "down" vector) may be referred to as Magnetic North. In various embodiments, Magnetic North, a "down" vector, and/or various other directions, positions, and/or fixed or relative reference frames may define an absolute coordinate frame, for example, where directional measurements referenced to an absolute coordinate frame may be referred to as absolute directional measurements (e.g., an "absolute" orientation). In some embodiments, directional measurements may initially be referenced to a coordinate frame of a particular sensor (e.g., a sonar transducer assembly or module of sonar system 110) and be transformed (e.g., using parameters for one or more coordinate frame transformations) to be referenced to an absolute coordinate frame and/or a coordinate frame of mobile structure 101. In various embodiments, an absolute coordinate frame may be defined and/or correspond to a coordinate frame with one or more undefined axes, such as a horizontal plane local to mobile structure 101 referenced to a local gravitational vector but with an unreferenced and/or undefined yaw reference (e.g., no reference to Magnetic North).

Sonar system 110 may be implemented as one or more electrically and/or mechanically coupled controllers, transmitters, receivers, transceivers, signal processing logic devices, various electrical components, transducer elements of various shapes and sizes, multichannel transducers/transducer modules, transducer assemblies, assembly brackets, transom brackets, and/or various actuators adapted to adjust orientations of any of the components of sonar system 110, as described herein. Sonar system 110 may be configured to emit one, multiple, or a series of acoustic beams, receive corresponding acoustic returns, and convert the acoustic returns into sonar data and/or imagery, such as bathymetric data, water depth, water temperature, water column/volume debris, bottom profile, and/or other types of sonar data. Sonar system 110 may be configured to provide such data and/or imagery to user interface 120 for display to a user, for example, or to controller 130 for additional processing, as described herein.

In some embodiments, sonar system 110 may be implemented using a compact design, where multiple sonar transducers, sensors, and/or associated processing devices are located within a single transducer assembly housing. In some embodiments, sonar system 110 may include orientation and/or position sensors configured to help provide two or three dimensional waypoints, increase sonar data and/or imagery quality, and/or provide highly accurate bathymetry data, as described herein.

In various embodiments, sonar system 110 may be configured to provide many different display views from a variety of selectable perspectives, including a downward viewing perspective, a side viewing perspective, a three dimensional perspective, and/or other types of sonar imaging, all using one or more user interfaces 120 but with different selectable configurations and/or processing methods, as described herein.

In general, embodiments of sonar system 110 may be configured to transmit acoustic beams of various selectable shapes and sizes, receive acoustic returns, and to provide the acoustic returns to user interface 120 in the form of data and/or sonar imagery, as described herein. In some embodiments, sonar system 110 may be implemented with optional orientation and/or position sensors (e.g., similar to orientation sensor 140, gyroscope/accelerometer 144, and/or GPS 146) that may be incorporated within a transducer assembly housing to provide three dimensional orientations and/or positions of the transducer assembly for use when processing or post processing sonar data for display. The sensor information can be used to correct for movement of transducer assemblies between ensonifications to provide improved alignment of corresponding acoustic returns/samples, for example, and/or to generate imagery based on the measured orientations and/or positions. In other embodiments, an external orientation and/or position sensor can be used alone or in combination with an integrated sensor or sensors.

In embodiments where sonar system 110 is implemented with an orientation and/or position sensor, system 100 may be configured to store such location/position information along with other sensor information (acoustic returns, temperature measurements, text descriptions, water depth, altitude, mobile structure speed, and/or other sensor and/or control information) and/or configuration data available to system 100. In some embodiments, controller 130 may be configured to generate a look up table so that a user can select desired configurations of sonar system 110 for a particular location or to coordinate with some other sensor information. Alternatively, an automated adjustment algorithm can be used to select optimum configurations based on the sensor information and/or a set of selected configurations.

For example, in one embodiment, mobile structure 101 may be located in an area identified on an chart using position data, a user may have selected a user setting for a configuration of sonar system 110, and controller 130 may be configured to control an actuator and/or otherwise implement the configuration for sonar system 110 (e.g., to set a particular orientation or channel selection). In another embodiment, controller 130 may be configured to determine water depth and/or altitude, and use such data to control an orientation or configuration setting of sonar system 110 to maintain an optimum orientation and/or channel for the reported depths/altitudes. In yet another embodiment, a user may be searching for fish in a wide area and may select a configuration setting that will adjust a transducer assembly configuration to ensonify a relatively broad, shallow area. In still another embodiment, controller 130 may be configured to receive orientation measurements for mobile structure 101. In such embodiment, controller 130 may be configured to control actuators associated with a transducer assembly to maintain its orientation relative to, for example, the water surface, and thus improve the displayed sonar images (e.g., by ensuring consistently oriented acoustic beams and/or proper registration of a series of acoustic returns). In various embodiments, controller 130 may be configured to control steering sensor/actuator 150 and/or propulsion system 170 to adjust a position and/or orientation of mobile structure 101 to help ensure proper registration of a series of acoustic returns, sonar data, and/or sonar imagery.

Although FIG. 1A shows various sensors and/or other components of system 100 separate from sonar system 110, in other embodiments, any one or combination of sensors and components of system 100 may be integrated with a sonar assembly, an actuator, a transducer module, and/or other components of sonar system 110. For example, orientation sensor 140 may be integrated with a transducer assembly of sonar system 110 and be configured to provide measurements of an absolute and/or relative orientation (e.g., a roll, pitch, and/or yaw) of the transducer assembly to controller 130 and/or user interface 120, either of which may also be integrated with sonar system 110.

User interface 120 may be implemented as a display, a touch screen, a keyboard, a mouse, a joystick, a knob, a steering wheel, a ship's wheel or helm, a yoke, and/or any other device capable of accepting user input and/or providing feedback to a user. In various embodiments, user interface 120 may be adapted to accept user input and provide the user input (e.g., as a type of signal and/or sensor information) to other devices of system 100, such as controller 130. User interface 120 may also be implemented with one or more logic devices that may be adapted to execute instructions, such as software instructions, implementing any of the various processes and/or methods described herein. For example, user interface 120 may be adapted to form communication links, transmit and/or receive communications (e.g., sensor signals, control signals, sensor information, user input, and/or other information), render and/or display a user interface, determine various coordinate frames and/or orientations, determine parameters for one or more coordinate frame transformations, and/or perform coordinate frame transformations, for example, or to perform various other processes and/or methods.

In various embodiments, user interface 120 may be adapted to accept user input, for example, to configure sonar system 110, to form a communication link, to select a particular wireless networking protocol and/or parameters for a particular wireless networking protocol and/or wireless link (e.g., a password, an encryption key, a MAC address, a device identification number, a device operation profile, parameters for operation of a device, and/or other parameters), to select a method of processing sensor signals to determine sensor information, to adjust a position and/or orientation of an articulated sensor, and/or to otherwise facilitate operation of system 100 and devices within system 100. Once user interface 120 accepts a user input, the user input may be processed internally and/or transmitted to other devices of system 100 over one or more communication links.

In one embodiment, user interface 120 may be adapted to receive a sensor or control signal (e.g., from orientation sensor 140 and/or steering sensor/actuator 150) over communication links formed by one or more associated logic devices, for example, and display sensor and/or other information corresponding to the received sensor or control signal to a user. In related embodiments, user interface 120 may be adapted to process sensor and/or control signals to determine sensor and/or other information. For example, a sensor signal may include an orientation, an angular velocity, an acceleration, a speed, and/or a position of mobile structure 101. In such embodiment, user interface 120 may be adapted to process the sensor signals to determine sensor information indicating an estimated and/or absolute roll, pitch, and/or yaw (attitude and/or rate), and/or a position or series of positions of mobile structure 101, for example, and display the sensor information as feedback to a user. In one embodiment, user interface 120 may be adapted to display a time series of various sensor information and/or other parameters as part of or overlaid on a graph or map, which may be referenced to a position and/or orientation of mobile structure 101. For example, user interface 120 may be adapted to display a time series of positions, headings, and/or orientations of mobile structure 101 and/or other elements of system 100 (e.g., a transducer assembly of sonar system 110) overlaid on a geographical map, which may include one or more graphs indicating a corresponding time series of actuator control signals, sonar data and/or imagery, and/or other sensor and/or control signals.

In some embodiments, user interface 120 may be adapted to accept user input including a user-defined target heading, route, and/or orientation for a transducer assembly, for example, and to generate control signals for steering sensor/actuator 150 and/or propulsion system 170 to cause mobile structure 101 to move according to the target heading, route, and/or orientation. In further embodiments, user interface 120 may be adapted to accept user input including a user-defined target attitude for an actuated device coupled to mobile structure 101 (e.g., sonar system 110), for example, and to generate control signals for adjusting an orientation of the actuated device according to the target attitude. More generally, user interface 120 may be adapted to display a user interface and/or sensor information to a user, for example, and/or to transmit sensor information and/or user input to other user interfaces, sensors, or controllers of system 100, for instance, for display and/or further processing.

Controller 130 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of sonar system 110, steering sensor/actuator 150, mobile structure 101, and/or system 100, for example. Such software instructions may also implement methods for processing sensor signals, determining sensor information, providing user feedback (e.g., through user interface 120), querying devices for operational parameters, selecting operational parameters for devices, or performing any of the various operations described herein (e.g., operations performed by logic devices of various devices of system 100).

In addition, a machine readable medium may be provided for storing non-transitory instructions for loading into and execution by controller 130. In these and other embodiments, controller 130 may be implemented with other components where appropriate, such as volatile memory, non-volatile memory, one or more interfaces, and/or various analog and/or digital components for interfacing with devices of system 100. For example, controller 130 may be adapted to store configuration settings, sensor signals, sensor information, parameters for coordinate frame transformations, calibration parameters, sets of calibration points, and/or other operational parameters, over time, for example, and provide such stored data to a user using user interface 120. In some embodiments, controller 130 may be integrated with one or more user interfaces (e.g., user interface 120), and, in one embodiment, may share a communication module or modules. As noted herein, controller 130 may be adapted to execute one or more control loops for actuated device control, steering control (e.g., using steering sensor/actuator 150) and/or performing other various operations of mobile structure 101 and/or system 100. In some embodiments, a control loop may include processing sensor signals and/or sensor information in order to control one or more operations of sonar system 110, mobile structure 101, and/or system 100.

Orientation sensor 140 may be implemented as one or more of a compass, float, accelerometer, and/or other device capable of measuring an orientation of mobile structure 101 (e.g., magnitude and direction of roll, pitch, and/or yaw, relative to one or more reference orientations such as gravity and/or Magnetic North) and providing such measurements as sensor signals that may be communicated to various devices of system 100. In some embodiments, orientation sensor 140 may be adapted to provide heading measurements for mobile structure 101. In other embodiments, orientation sensor 140 may be adapted to provide roll, pitch, and/or yaw rates for mobile structure 101 (e.g., using a time series of orientation measurements). Orientation sensor 140 may be positioned and/or adapted to make orientation measurements in relation to a particular coordinate frame of mobile structure 101, for example.

Speed sensor 142 may be implemented as an electronic pitot tube, metered gear or wheel, water speed sensor, wind speed sensor, a wind velocity sensor (e.g., direction and magnitude) and/or other device capable of measuring or determining a linear speed of mobile structure 101 (e.g., in a surrounding medium and/or aligned with a longitudinal axis of mobile structure 101) and providing such measurements as sensor signals that may be communicated to various devices of system 100. In some embodiments, speed sensor 142 may be adapted to provide a velocity of a surrounding medium relative to sensor 142 and/or mobile structure 101.

Gyroscope/accelerometer 144 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of mobile structure 101 and providing such measurements as sensor signals that may be communicated to other devices of system 100 (e.g., user interface 120, controller 130). Gyroscope/accelerometer 144 may be positioned and/or adapted to make such measurements in relation to a particular coordinate frame of mobile structure 101, for example. In various embodiments, gyroscope/accelerometer 144 may be implemented in a common housing and/or module to ensure a common reference frame or a known transformation between reference frames.

GPS 146 may be implemented as a global positioning satellite receiver and/or other device capable of determining absolute and/or relative position of mobile structure 101 based on wireless signals received from space-born and/or terrestrial sources, for example, and capable of providing such measurements as sensor signals that may be communicated to various devices of system 100. In some embodiments, GPS 146 may be adapted to determine a velocity, speed, and/or yaw rate of mobile structure 101 (e.g., using a time series of position measurements), such as an absolute velocity and/or a yaw component of an angular velocity of mobile structure 101. In various embodiments, one or more logic devices of system 100 may be adapted to determine a calculated speed of mobile structure 101 and/or a computed yaw component of the angular velocity from such sensor information.

Steering sensor/actuator 150 may be adapted to physically adjust a heading of mobile structure 101 according to one or more control signals, user inputs, and/or other signals provided by a logic device of system 100, such as controller 130. Steering sensor/actuator 150 may include one or more actuators and control surfaces (e.g., a rudder or other type of steering mechanism) of mobile structure 101, and may be adapted to physically adjust the control surfaces to a variety of positive and/or negative steering angles/positions.

Propulsion system 170 may be implemented as a propeller, turbine, or other thrust-based propulsion system, a mechanical wheeled and/or tracked propulsion system, a sail-based propulsion system, and/or other types of propulsion systems that can be used to provide motive force to mobile structure 101. In some embodiments, propulsion system 170 may be non-articulated, for example, such that the direction of motive force and/or thrust generated by propulsion system 170 is fixed relative to a coordinate frame of mobile structure 101. Non-limiting examples of non-articulated propulsion systems include, for example, an inboard motor for a watercraft with a fixed thrust vector, for example, or a fixed aircraft propeller or turbine. In other embodiments, propulsion system 170 may be articulated, for example, and may be coupled to and/or integrated with steering sensor/actuator 150, for example, such that the direction of generated motive force and/or thrust is variable relative to a coordinate frame of mobile structure 101. Non-limiting examples of articulated propulsion systems include, for example, an outboard motor for a watercraft, an inboard motor for a watercraft with a variable thrust vector/port (e.g., used to steer the watercraft), a sail, or an aircraft propeller or turbine with a variable thrust vector, for example.

Other modules 180 may include other and/or additional sensors, actuators, communications modules/nodes, and/or user interface devices used to provide additional environmental information of mobile structure 101, for example. In some embodiments, other modules 180 may include a humidity sensor, a wind and/or water temperature sensor, a barometer, a radar system, a visible spectrum camera, an infrared camera, and/or other environmental sensors providing measurements and/or other sensor signals that can be displayed to a user and/or used by other devices of system 100 (e.g., controller 130) to provide operational control of mobile structure 101 and/or system 100 that compensates for environmental conditions, such as wind speed and/or direction, swell speed, amplitude, and/or direction, and/or an object in a path of mobile structure 101, for example. In some embodiments, other modules 180 may include one or more actuated devices (e.g., spotlights, cameras, radars, sonars, and/or other actuated devices) coupled to mobile structure 101, where each actuated device includes one or more actuators adapted to adjust an orientation of the device, relative to mobile structure 101, in response to one or more control signals (e.g., provided by controller 130).

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sonar data and/or imagery, for example, or for transmitting and/or receiving communications, such as sensor signals, sensor information, and/or control signals, between one or more devices of system 100. In one embodiment, such method may include instructions to receive an orientation, acceleration, position, and/or speed of mobile structure 101 and/or sonar system 110 from various sensors, to determine a transducer orientation adjustment (e.g., relative to a desired transducer orientation) from the sensor signals, and/or to control an actuator to adjust a transducer orientation accordingly, for example. In a further embodiment, such method may include instructions for forming one or more communication links between various devices of system 100.

In addition, one or more machine readable mediums may be provided for storing non-transitory instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Each of the elements of system 100 may be implemented with one or more amplifiers, modulators, phase adjusters, beamforming components, digital to analog converters (DACs), analog to digital converters (ADCs), various interfaces, antennas, transducers, and/or other analog and/or digital components enabling each of the devices of system 100 to transmit and/or receive signals, for example, in order to facilitate wired and/or wireless communications between one or more devices of system 100. Such components may be integrated with a corresponding element of system 100, for example. In some embodiments, the same or similar components may be used to perform one or more sensor measurements, as described herein. For example, the same or similar components may be used to produce an acoustic beam, receive an acoustic return (e.g., a sound wave received by a sonar transducer element and/or corresponding electrical signals from the sonar transducer element), convert the acoustic return to acoustic return data, and/or store sensor information, configuration data, and/or other data corresponding to operation of sonar system 110, as described herein. Specifically, sonar system 110 may be implemented with a sonar controller similar to controller 130 but with components (e.g., a transmitter and/or receiver) adapted to provide signals to a transducer assembly to produce acoustic beams and/or to receive signals from the transducer assembly and convert them to acoustic return data. Such sonar controllers may be separate from or integrated with a transducer assembly of sonar system 110 and/or a user interface (user interface 120). Sensor signals, control signals, and other signals may be communicated among elements of system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of system 100 may include one or more modules supporting wired, wireless, and/or a combination of wired and wireless communication techniques.

In some embodiments, various elements or portions of elements of system 100 may be integrated with each other, for example, or may be integrated onto a single printed circuit board (PCB) to reduce system complexity, manufacturing costs, power requirements, and/or timing errors between the various sensor measurements. For example, gyroscope/accelerometer 144 and controller 130 may be configured to share one or more components, such as a memory, a logic device, a communications module, and/or other components, and such sharing may act to reduce and/or substantially eliminate such timing errors while reducing overall system complexity and/or cost.

Each element of system 100 may include one or more batteries or other electrical power storage devices, for example, and may include one or more solar cells or other electrical power generating devices (e.g., a wind or water-powered turbine, or a generator producing electrical power from motion of one or more elements of system 100). In some embodiments, one or more of the devices may be powered by a power source for mobile structure 101, using one or more power leads. Such power leads may also be used to support one or more communication techniques between elements of system 100.

In various embodiments, a logic device of system 100 (e.g., of orientation sensor 140 and/or other elements of system 100) may be adapted to determine parameters (e.g., using signals from various devices of system 100) for transforming a coordinate frame of sonar system 110 and/or other sensors of system 100 to/from a coordinate frame of mobile structure 101, at-rest and/or in-motion, and/or other coordinate frames, as described herein. One or more logic devices of system 100 may be adapted to use such parameters to transform a coordinate frame of sonar system 110 and/or other sensors of system 100 to/from a coordinate frame of orientation sensor 140 and/or mobile structure 101, for example. Furthermore, such parameters may be used to determine and/or calculate one or more adjustments to an orientation of sonar system 110 that would be necessary to physically align a coordinate frame of sonar system 110 with a coordinate frame of orientation sensor 140 and/or mobile structure 101, for example, or an absolute coordinate frame. Adjustments determined from such parameters may be used to selectively power adjustment servos/actuators (e.g., of sonar system 110 and/or other sensors or elements of system 100), for example, or may be communicated to a user through user interface 120, as described herein.

Figure 1B:
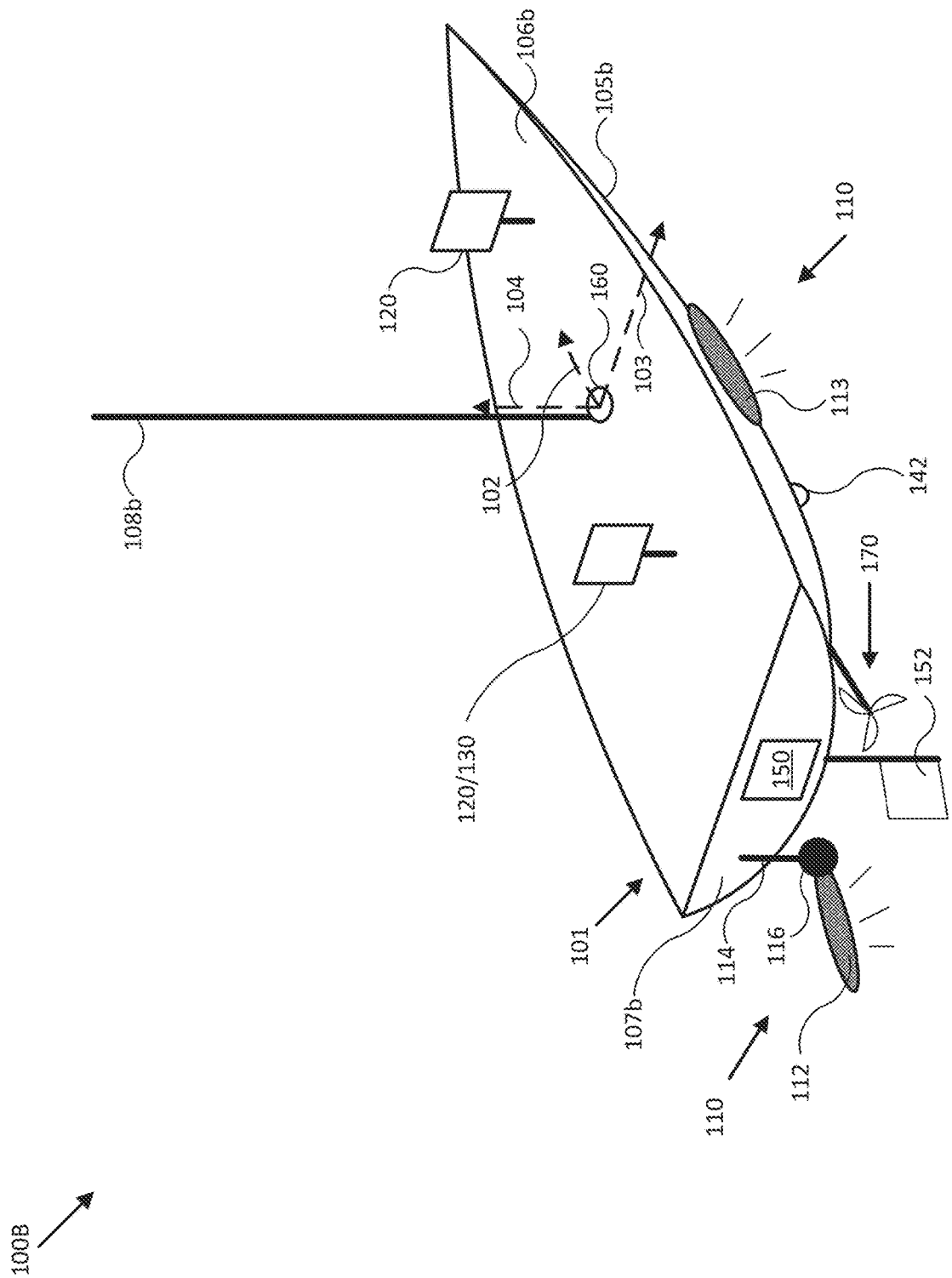
FIG. 1B illustrates a diagram of a sonar user interface system in accordance with an embodiment of the disclosure.

FIG. 1B illustrates a diagram of system 100B in accordance with an embodiment of the disclosure. In the embodiment shown in FIG. 1B, system 100B may be implemented to provide sonar data and/or imagery for use with operation of mobile structure 101, similar to system 100 of FIG. 1A. For example, system 100B may include sonar system 110, integrated user interface/controller/sonar controller 120/130, secondary user interface 120, steering sensor/actuator 150, sensor cluster 160 (e.g., orientation sensor 140, gyroscope/accelerometer 144, and/or GPS 146), and various other sensors and/or actuators. In the embodiment illustrated by FIG. 1B, mobile structure 101 is implemented as a motorized boat including a hull 105b, a deck 106b, a transom 107b, a mast/sensor mount 108b, a rudder 152, an inboard motor 170, and sonar system 110 including transducer assembly 112 coupled to transom 107b and transducer assembly 113 coupled to hull 105b. In other embodiments, hull 105b, deck 106b, mast/sensor mount 108b, rudder 152, inboard motor 170, and various actuated devices may correspond to attributes of a passenger aircraft or other type of vehicle, robot, or drone, for example, such as an undercarriage, a passenger compartment, an engine/engine compartment, a trunk, a roof, a steering mechanism, a headlight, a radar system, and/or other portions of a vehicle.

As depicted in FIG. 1B, mobile structure 101 includes sonar system 110, which in turn includes transducer assembly 112 coupled to transom 107b of mobile structure 101 through assembly bracket/actuator 116 and transom bracket/electrical conduit 114, and transducer assembly 113 coupled directly to hull 105b. In various embodiments, user interface/controller/sonar controller 120/130 may be adapted to provide a user interface allowing a user to configure operation of transducer assemblies 112 and 113 and/or other transducer assemblies of sonar system 110.

In some embodiments, assembly bracket/actuator 116 may be implemented as a roll, pitch, and/or yaw actuator, for example, and may be adapted to adjust an orientation of transducer assembly 112 according to control signals and/or an orientation (e.g., roll, pitch, and/or yaw) or position of mobile structure 101 provided by user interface/controller/sonar controller 120/130. For example, user interface/controller/sonar controller 120/130 may be adapted to receive an orientation of transducer assembly 112 configured to ensonify a portion of surrounding water and/or a direction referenced to an absolute coordinate frame, and to adjust an orientation of transducer assembly 112 to retain ensonification of the position and/or direction in response to motion of mobile structure 101, using one or more orientations and/or positions of mobile structure 101 and/or other sensor information derived by executing various methods described herein. In another embodiment, user interface/controller/sonar controller 120/130 may be configured to adjust an orientation of transducer assembly 112 to direct sonar transmissions from transducer assembly 112 substantially downwards and/or along an underwater track during motion of mobile structure 101. In such embodiment, the underwater track may be predetermined, for example, or may be determined based on criteria parameters, such as a minimum allowable depth, a maximum ensonified depth, a bathymetric route, and/or other criteria parameters.

In one embodiment, user interfaces 120 may be mounted to mobile structure 101 substantially on deck 106b and/or mast/sensor mount 108b. Such mounts may be fixed, for example, or may include gimbals and other leveling mechanisms/actuators so that a display of user interfaces 120 stays substantially level with respect to a horizon and/or a "down" vector (e.g., to mimic typical user head motion/orientation). In another embodiment, at least one of user interfaces 120 may be located in proximity to mobile structure 101 and be mobile throughout a user level (e.g., deck 106b) of mobile structure 101. For example, secondary user interface 120 may be implemented with a lanyard and/or other type of strap and/or attachment device and be physically coupled to a user of mobile structure 101 so as to be in proximity to mobile structure 101. In various embodiments, user interfaces 120 may be implemented with a relatively thin display that is integrated into a PCB of the corresponding user interface in order to reduce size, weight, housing complexity, and/or manufacturing costs.

As shown in FIG. 1B, in some embodiments, speed sensor 142 may be mounted to a portion of mobile structure 101, such as to hull 105b, and be adapted to measure a relative water speed. In some embodiments, speed sensor 142 may be adapted to provide a thin profile to reduce and/or avoid water drag. In various embodiments, speed sensor 142 may be mounted to a portion of mobile structure 101 that is substantially outside easy operational accessibility. Speed sensor 142 may include one or more batteries and/or other electrical power storage devices, for example, and may include one or more water-powered turbines to generate electrical power. In other embodiments, speed sensor 142 may be powered by a power source for mobile structure 101, for example, using one or more power leads penetrating hull 105b. In alternative embodiments, speed sensor 142 may be implemented as a wind velocity sensor, for example, and may be mounted to mast/sensor mount 108b to have relatively clear access to local wind.

In the embodiment illustrated by FIG. 1B, mobile structure 101 includes direction/longitudinal axis 102, direction/lateral axis 103, and direction/vertical axis 104 meeting approximately at mast/sensor mount 108b (e.g., near a center of gravity of mobile structure 101). In one embodiment, the various axes may define a coordinate frame of mobile structure 101 and/or sensor cluster 160. Each sensor adapted to measure a direction (e.g., velocities, accelerations, headings, or other states including a directional component) may be implemented with a mount, actuators, and/or servos that can be used to align a coordinate frame of the sensor with a coordinate frame of any element of system 100B and/or mobile structure 101. Each element of system 100B may be located at positions different from those depicted in FIG. 1B. Each device of system 100B may include one or more batteries or other electrical power storage devices, for example, and may include one or more solar cells or other electrical power generating devices. In some embodiments, one or more of the devices may be powered by a power source for mobile structure 101. As noted herein, each element of system 100B may be implemented with an antenna, a logic device, and/or other analog and/or digital components enabling that element to provide, receive, and process sensor signals and interface or communicate with one or more devices of system 100B. Further, a logic device of that element may be adapted to perform any of the methods described herein.

Figure 2A:
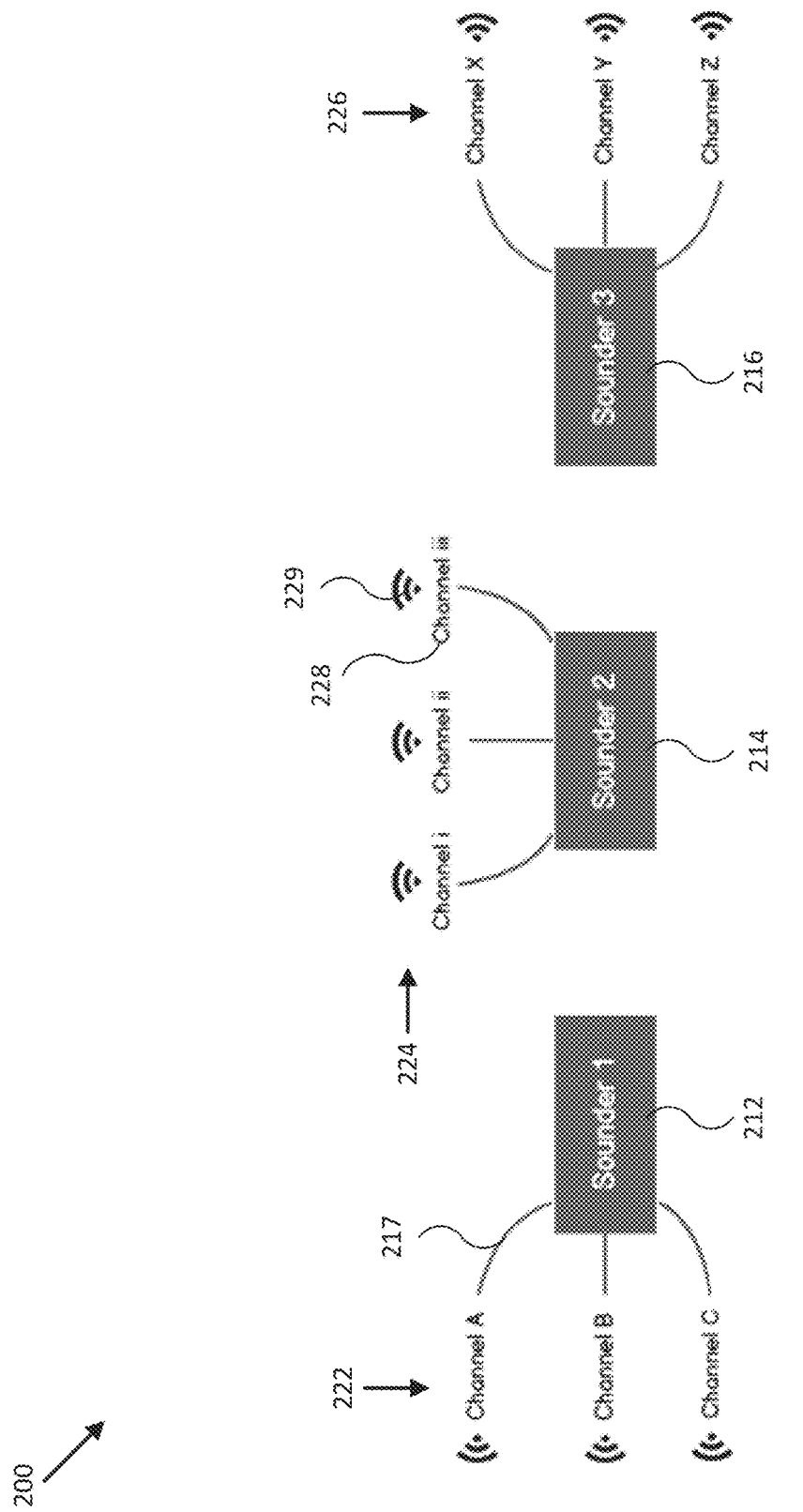
FIGS. 2A-F illustrate various display views of a sonar user interface in accordance with embodiments of the disclosure.

FIG. 2A illustrates a display view 200 of a sonar user interface in accordance with an embodiment of the disclosure. For example, user interface 120 and/or other components of system 100 of FIG. 1A may be configured to render display view 200 and present it to a user on a corresponding touch screen display to provide a sonar user interface. In the embodiment shown in FIG. 2A, display view 200 includes a system graph 210 that may be displayed by user interface 120 to graphically indicate the number, position, and/or relative orientation of various sonar controllers and/or transducer assemblies (e.g., which may generally be collectively referred to as sounders), such as sonar controller 130 and/or transducer assemblies 112 and 113 of sonar system 110 in FIG. 1B. As shown in FIG. 2A, system graph 210 may include one or more sounder graphics 212, 214, 216, each with respective channel list graphics 222, 224, 226, visually linked to their corresponding sonar controller and/or transducer assembly by one or more group indicators 217.

In some embodiments, each sounder graphic may include a shape, descriptive text, enumerator, and/or relative position within system graph 210, in addition to the graphic itself, to indicate a real world position of a corresponding transducer assembly relative to other transducer assemblies of sonar system 110, a shape of a corresponding acoustic beam, a manufacturer model number, a system id, and/or other associated configuration data. Each sonar controller and/or transducer assembly may be implemented with one or more differentiated channels, which may correspond to different transducer assemblies coupled to a sonar controllers, different transducer elements within a transducer assembly, and/or a different configuration of a transducer element. For example, channel A of channel list graphic 222 may correspond to a circular transducer within transducer assembly 212 operated at 50 kHz, channel B of channel list graphic 222 may correspond to a linear transducer operated at 50 kHz, and channel C may correspond to the circular transducer of channel A operated at 150 kHz. In other embodiments, channels may be differentiated by a particular orientation (e.g., actuated and/or non-actuated) of a transducer element within a transducer assembly and/or the transducer assembly itself. In further embodiments, different channels may correspond to different transducer assemblies coupled to a sonar controller represented by a corresponding sounder graphic.

In related embodiments, each of channel list graphics 222, 224, 226 may include one or more channel indicators 228 and/or beam indicators 229. In some embodiments, a shape, size, descriptive text, enumerator, and/or relative position of channel indicators 228 and/or beam indicators 229 may indicate that channel's relative orientation, width, shape, frequency, system id, and/or other associated configuration data. In various embodiments, each graphic within system graph 210 may be user selectable, such as by a selector (e.g., a pointer operated by a joystick or mouse), a user finger or stylus (e.g., as with a touch screen) to select operation of the corresponding sonar controller, transducer assembly, channel, and/or group of sonar controllers, transducer assemblies, and/or channels, as described herein.

Figure 2B:
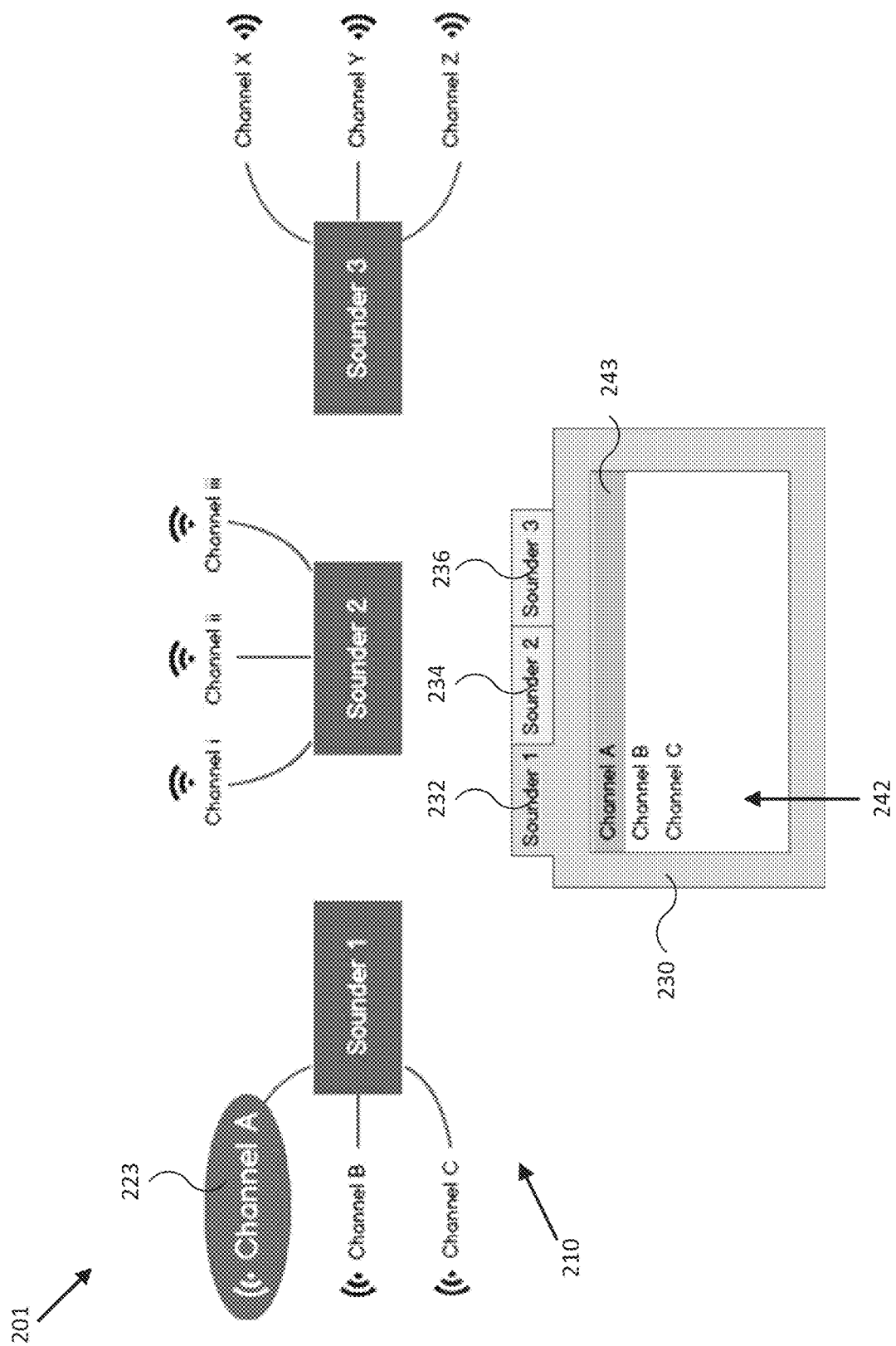

FIG. 2B illustrates a display view 201 of a sonar user interface in accordance with an embodiment of the disclosure. In the embodiment shown in FIG. 2B, display view 201 includes system graph 210 and tabbed window 230, where tabbed window 230 provides for user selection of channels from channel lists segregated into tabs corresponding to the available sonar controllers and/or transducer assemblies, such as sonar controller 130 and/or transducer assemblies 112 and 113 of sonar system 110 in FIG. 1B. In some embodiments, display view 201 may include tabbed window 230 without system graph 210. In various embodiments, tabbed window 230 may be implemented more generally as a hierarchical selection interface configured to allow a user to select among a group of sounders, for example, and then to select among a group of associated channels for operation and/or further configuration (e.g., using channel list window 310 of FIGS. 3A-3E).

As shown in FIG. 2B, tabbed window 230 may include one or more tabs 232, 234, 236, each including a textual channel list, such as channel list 242, corresponding to available channels for the indicated sonar controller and/or transducer assembly. Also shown are selector graphic 223 of system graph 210 and selector graphic 243 of tabbed window 230. Each of selector graphics 223 and 243 may be configured to indicate a channel selected by a user, for operation or for further configuration, as described herein. In some embodiments, a descriptive text, enumerator, and/or organization of tabs 232, 234, 236 and/or channel list 242 may be configured to indicate the corresponding assembly's and/or channel's relative orientation, width, shape, frequency, system id, and/or other associated configuration data. In various embodiments, each item within channel list 242 may be user selectable (e.g., by toggle) to select operation of the corresponding sonar controller, transducer assembly, channel, and/or group of sonar controllers, transducer assemblies, and/or channels, as described herein. In some embodiments, channel list 242 may include channels not graphically shown in system graph 210, and tabbed window 230 may be configured to allow a user to select which channels are displayed graphically in system graph 210.

Figure 2C:
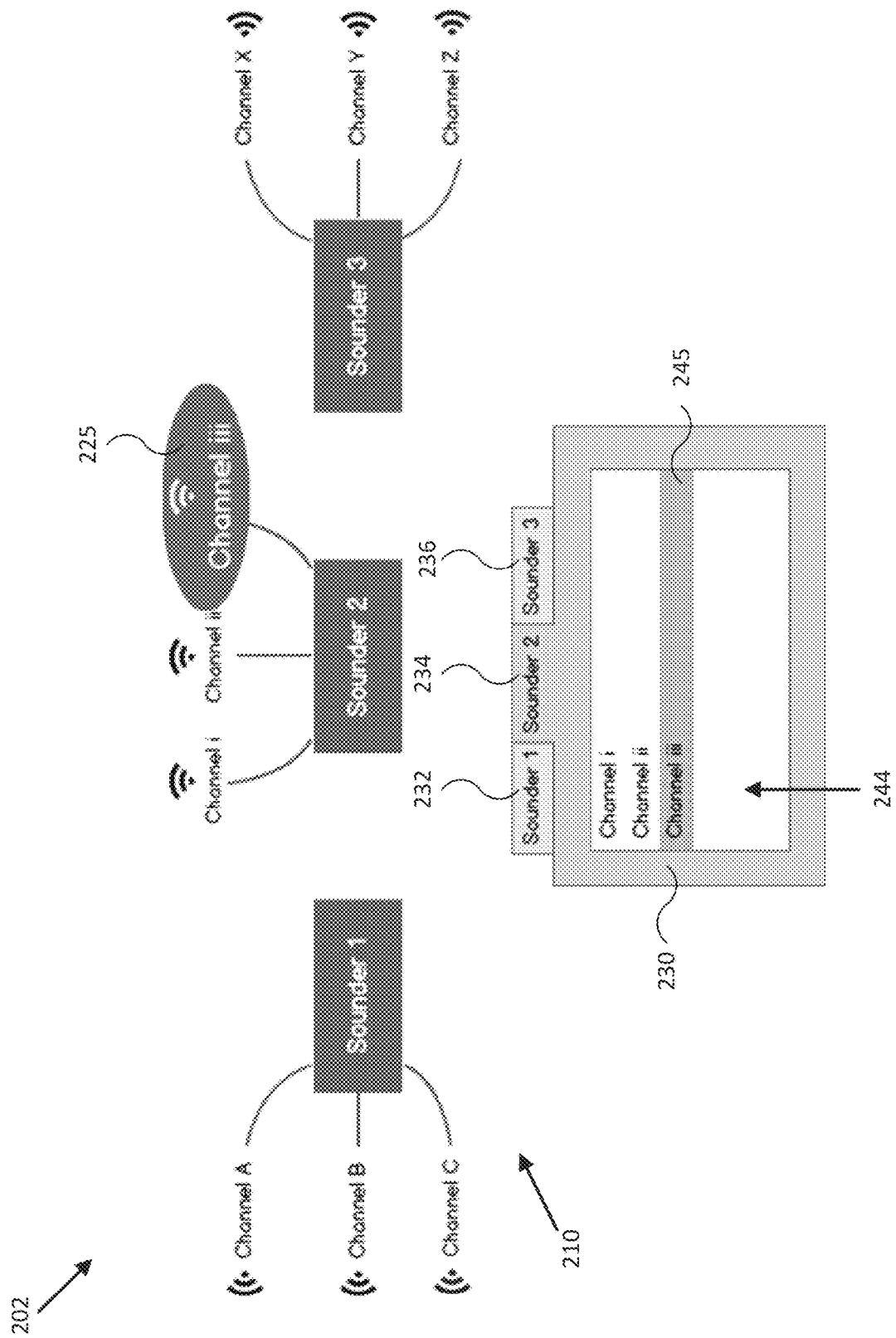
Figure 2D:
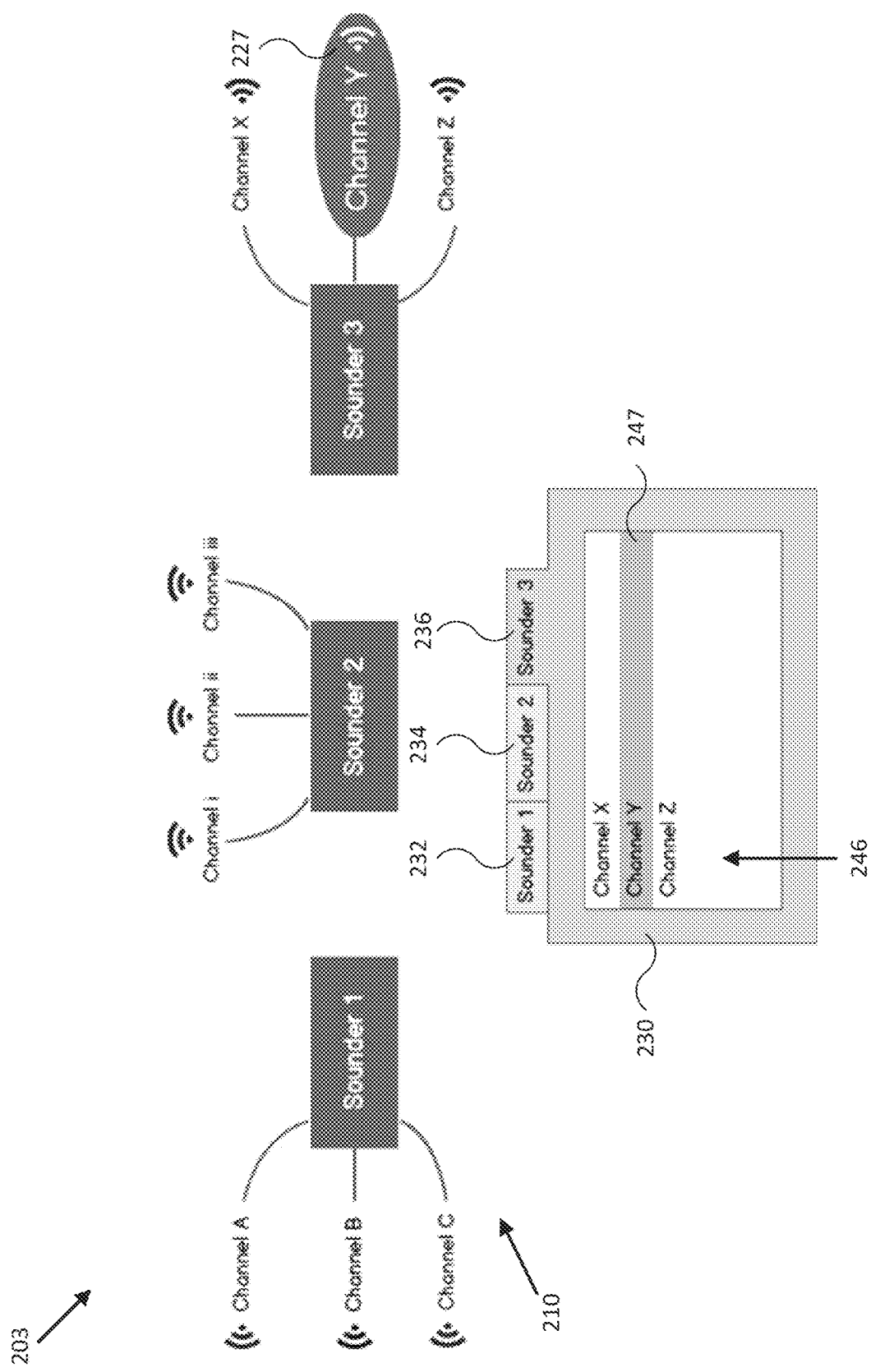

FIGS. 2C and 2D illustrate display views 202, 203 of sonar user interfaces in accordance with embodiments of the disclosure. In the embodiment shown in FIG. 2C, display view 202 includes system graph 210, tabbed window 230, tab 234, and selector graphics 225 and 245 indicating that channel iii has been selected by a user for operation and/or configuration. In the embodiment shown in FIG. 2D, display view 203 includes system graph 210, tabbed window 230, tab 236, and selector graphics 227 and 247 indicating that channel Y has been selected by a user for operation and/or configuration. In various embodiments, display views 202 and/or 203 may include tabbed window 230 without system graph 210.

Figure 2E:
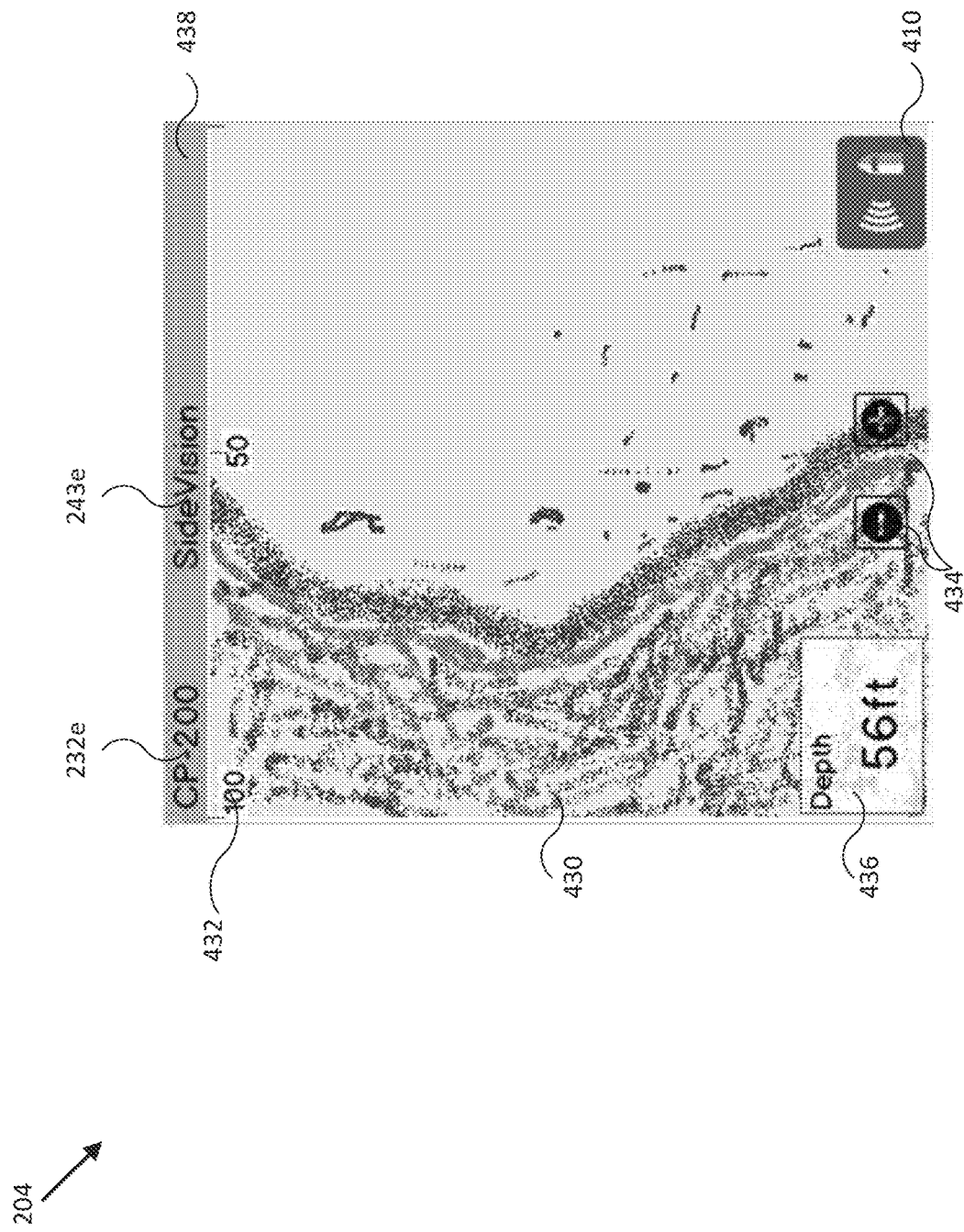

FIG. 2E illustrates display view 204 of a sonar user interface in accordance with an embodiment of the disclosure. In particular, the embodiment shown in FIG. 2E illustrates display of a sonar user interface after selection of channel A of channel list 242 in FIG. 2B. In some embodiments, user interface 120 may be configured to render display view 204 immediately upon selection of a channel in a channel list, for example, or after additional user input selecting display of a display view including a chart, such as chart 430. As shown, display view 204 includes configuration graphic 410 overlaid on chart 430, where configuration graphic 410 is adapted to convey and/or indicate, graphically without text, a configuration of sonar system 110 to a user intuitively and/or at a glance, as described more fully below. In the embodiment shown in FIG. 2E, chart 430 may be implemented as a time based series of sonar data provided by a port transducer assembly. Chart 430 may include a variety of chart objects, such as scale level/range indicators 432, scale buttons 434, and depth indicator 436. In some embodiments, chart 430 may be implemented as a geographic map, a bathymetric chart, a combined data chart (e.g., radar, sonar, geographic map, and/or bathymetric chart), and/or other type of chart. In other embodiments, display view 204 may include multiple charts corresponding to different types of charts and/or displaying data from different channels, transducer assemblies, and/or sonar controllers, as described herein. In various embodiments, chart 430 includes sensor data and/or imagery of an environment local to mobile structure 101.

Also shown in FIG. 2E is chart header 438, which may include sounder indicator 232e, and/or channel indicator 243e. Sounder indicator 232e may include a shape, descriptive text, enumerator, and/or relative position within chart header 438 to indicate a manufacturer model number, a system id, and/or other associated configuration data of the corresponding sonar controller and/or transducer assembly providing data for display in chart 430 (e.g., the active sounder). Similarly, channel indicator 243e may include a shape, descriptive text, enumerator, and/or relative position within chart header 438 to indicate a manufacturer model number, a system id, and/or other associated configuration data of the corresponding channel providing data for display in chart 430 (e.g., the active channel).

Figure 2F:
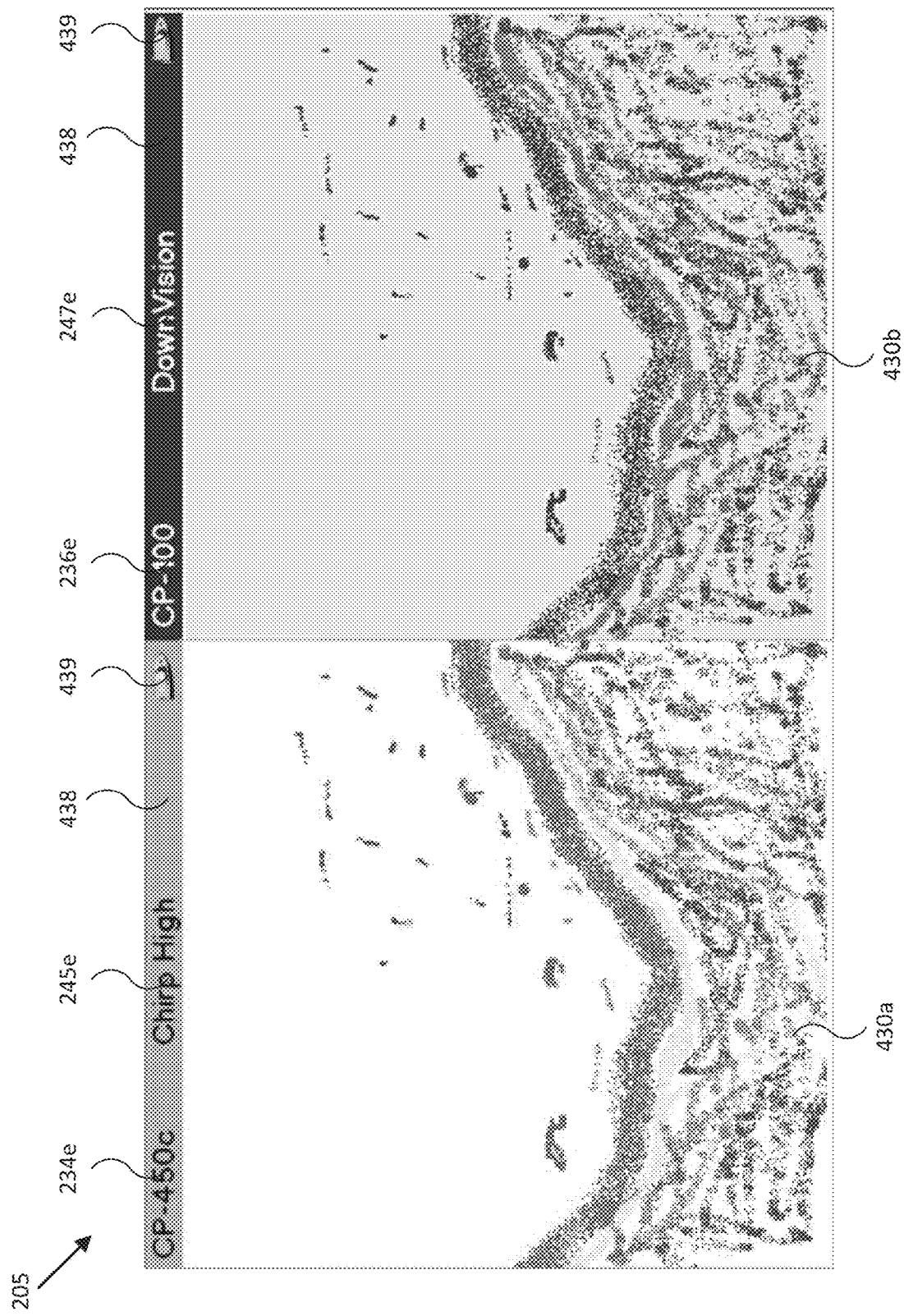

FIG. 2F illustrates display view 205 of a sonar user interface in accordance with an embodiment of the disclosure. In particular, the embodiment shown in FIG. 2F illustrates display of a sonar user interface after selection of channels iii and Y of channel lists 244 and 246 in FIGS. 2C and 2D. As shown, display view 205 includes charts 430a and 430b, which in some embodiments may correspond respectively to channel iii and Y of FIGS. 2C and 2D. In the embodiment shown in FIG. 2E, charts 430a and 430b may be implemented similar to chart 430 of FIG. 2E, but differentiated by selected channel (e.g., transmission type, orientation, and/or other configuration data) as shown. Also shown in FIG. 2F are chart headers 438, which may include respective sounder indicators 234e, 236e, and/or channel indicators 245e, 247e. Sounder indicators 234e, 236e, and/or channel indicators 245e, 247e, may be implemented and/or configured similarly to sounder indicator 232e and/or channel indicator 243e of FIG. 2E (e.g., to indicate a corresponding active sonar controller and/or channel). In some embodiments, chart header 438 may include vessel indicator 439, which may be configured to indicate an orientation of mobile structure 101 relative to sonar data and/or imagery displayed in corresponding charts (e.g., charts 430a and/or 430b). For example, as shown, vessel indicator 439 above chart 430a indicates that sonar data in chart 430a is arranged in a time series with the most recent sonar data/imagery displayed on a right side of chart 430a, which may be scrolled to the left as new sonar data/imagery is acquired.

FIGS. 3A-3E illustrate display views 300-304 of sonar user interfaces in accordance with embodiments of the disclosure. In the embodiment shown in FIG. 3A, display view 300 includes a channel list window 310 including textual channel list 312 that may be displayed by user interface 120 to indicate the number, position, relative orientation, and/or other configuration data for channels of a sonar controller and/or transducer assembly of sonar system 110. In addition, channel list window 310 may be configured to allow user selection and/or configuration of configuration list 312 and/or items within configuration list 312. For example, channel list window 310 may include selector graphic 314 (e.g., corresponding to a highlighted channel list item) indicating a channel list item that is active for operations and/or configuration. In some embodiments, channel list window 310 may be implemented as one of the tabs of tabbed window 230.

Figure 3A:
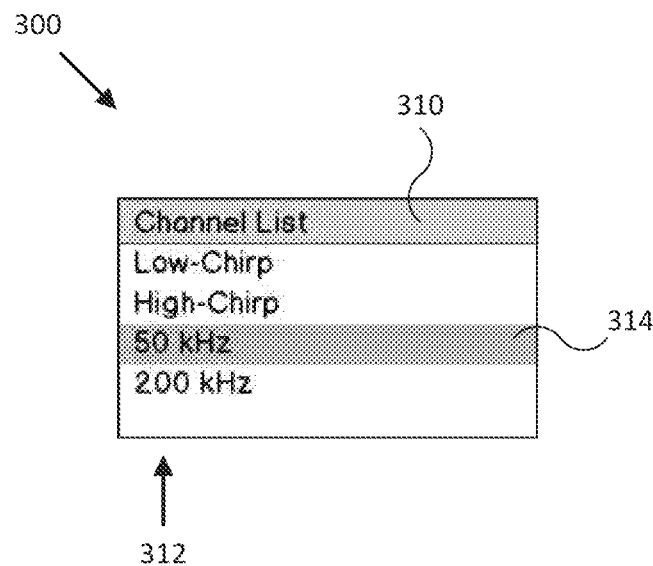
Figure 3B:
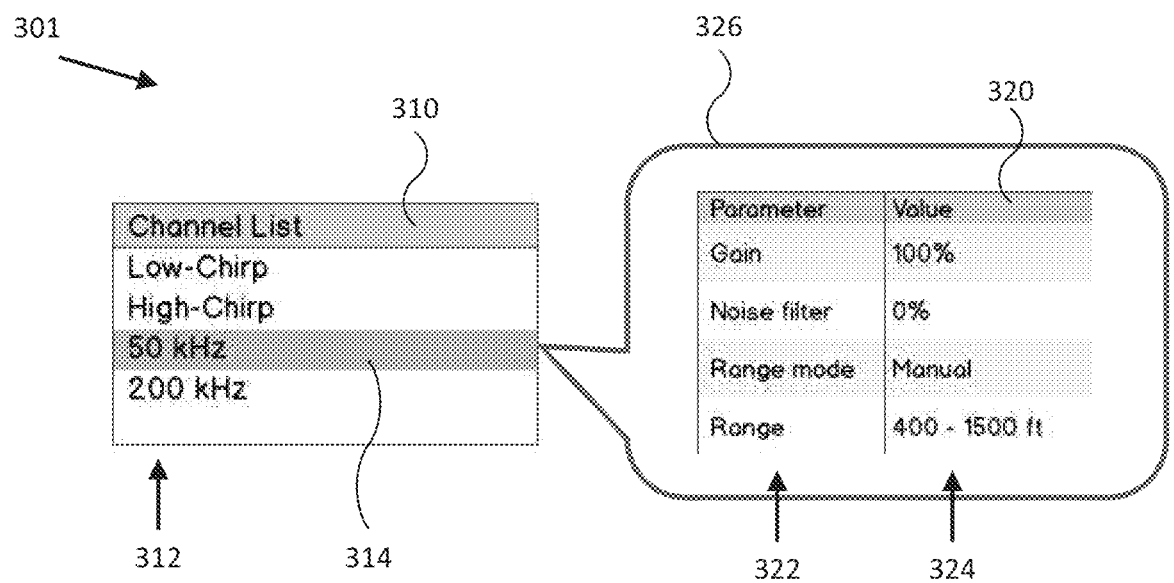

In the embodiment shown in FIG. 3B, display view 301 includes parameter window 320 linked to the channel list item highlighted by selector graphic 314 by dialog indicator 326. In some embodiments, parameter window 320 may be configured to display various configuration data to a user and/or provide for adjustment of the configuration data. For example, in some embodiments parameter window 320 may include parameter list 322 and/or corresponding value list 324. In such embodiments, each of the values in value list 324 may be selected and adjusted by a user (e.g., using a keyboard, joystick, touch screen buttons, and/or other user interface components).

In some embodiments, channel list window 310 may be configured to provide for user adjustment of channel list 312. For example, in the embodiment shown in FIG. 3C, display view 302 includes channel list window 310 greyed out to indicate it is subordinate to channel list menu 330. In other embodiments, channel list menu 330 may be implemented as a full screen menu. Channel list menu 330 of channel list window 310 may be configured to display a selection of actions that may be applied to an item of channel list 312, such as adding new items, deleting items, editing items, copying items, and/or other list actions. As shown, channel list menu 330 may include descriptive text, icons, and/or other attributes indicating a corresponding action, such as a copying action selected by selector 332. Each action may include a variety of operations, including a dialog to allow designation of a name for a new, edited, and/or copied item, for example. In the embodiment shown in FIG. 3D, display view 303 shows channel list window 310 including channel list 313 with an additional copied item highlighted by selector graphic 334.

Once user adjustment of channel list 313 is complete, channel list window 310 may be configured (e.g., through user input provided to user interface 120) to display configuration data for one or more channels within channel list 313, such as for comparison and/or for further adjustment. In the embodiment shown in FIG. 3E, display view 304 shows channel list window 310 including parameter windows 320 and 340 linked to respective items in channel list 313 by dialog indicators 326 and 346. Each of parameter windows 320 and 340 include respective parameter lists 322 and 342 and value lists 324 and 344. As shown, user interface 120 may be configured to render selector graphic 334 to indicate that one or more values in value list 344 of parameter window 340 are available for user adjustment/selection.

Figure 4A:
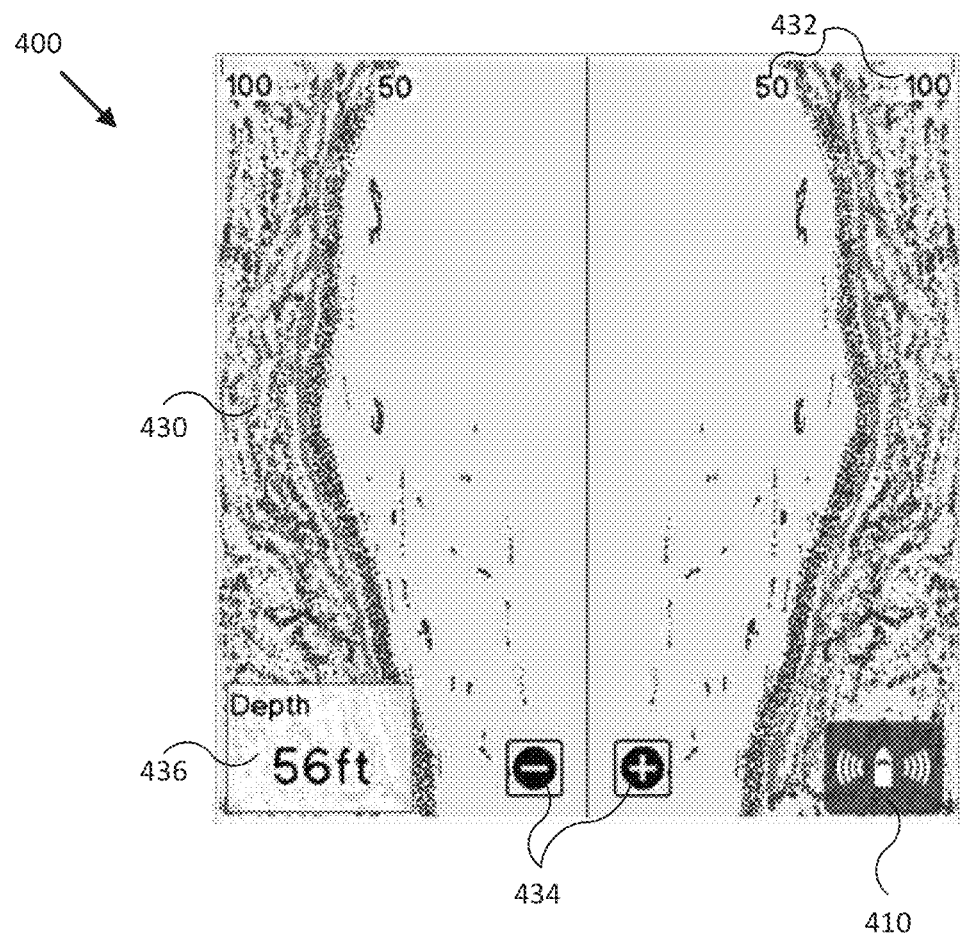
FIG. 4A illustrates a display view of a sonar user interface in accordance with an embodiment of the disclosure.

FIG. 4A illustrates display view 400 of a sonar user interface in accordance with an embodiment of the disclosure. In particular, the embodiment shown in FIG. 4A illustrates use of a sonar user interface during operation of sonar system 110. As shown, display view 400 includes configuration graphic 410 overlaid on chart 430, where configuration graphic 410 is adapted to convey and/or indicate, graphically without text, a configuration of sonar system 110 to a user intuitively and/or at a glance. In some embodiments, configuration graphic 410 may also be adapted to provide for easy user selection of a configuration for sonar system 110, as described herein. In the embodiment shown in FIG. 4A, chart 430 may be implemented as a time based series of sonar data provided by port and starboard transducer assemblies. Chart 430 may include a variety of chart objects, such as scale level/range indicators 432, scale buttons 434, and depth indicator 436. In some embodiments, chart 430 may be implemented as a geographic map, a bathymetric chart, a combined data chart (e.g., radar, sonar, geographic map, and/or bathymetric chart), and/or other type of chart. In various embodiments, chart 430 includes sensor data and/or imagery of an environment local to the mobile structure.

Figure 4B:
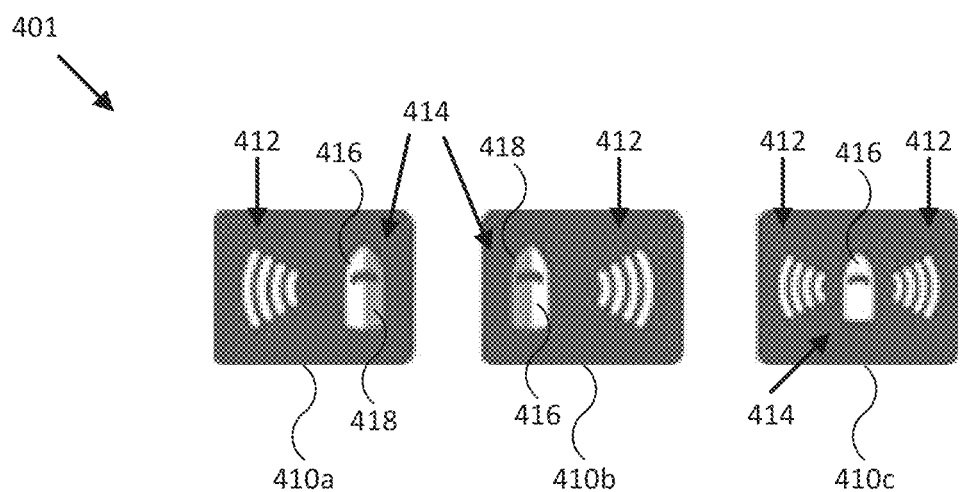
FIG. 4B illustrates detailed views of configuration/selection graphics for a sonar user interface in accordance with an embodiment of the disclosure.

FIG. 4B illustrates detailed views of configuration/selection graphics 410a, 410b, 410c for a sonar user interface in accordance with an embodiment of the disclosure. For example, each configuration graphic 410a, 410b, 410c includes a beam indicator 412 and a vessel indicator 414 including an energized portion 416 corresponding to beam indicator 412 and/or a non-energized portion 418. In some embodiments, each beam indicator 412 may include a shape, size, relative orientation and/or position within its corresponding configuration graphic, transparency, color, intensity, and/or other graphical attribute configured to indicate a real world position, orientation, operational status, and/or other attribute or configuration data of a corresponding transducer assembly and/or channel relative to other transducer assemblies and/or channels of sonar system 110. For example, user interface 120 may be configured to render beam indicator 412 according to the appropriate configuration data. In similar fashion, energized portion 416 of vessel indicator 414 may include a shape, relative orientation and/or position within its corresponding vessel indicator 414, transparency, color, intensity, and/or other graphical attribute configured to indicate operational status of its corresponding beam indicator. Non-energized portion 418 may include similar attributes configured to indicate non-operational status of a corresponding transducer assembly.

For example, in one embodiment, user interface 120 may be configured to render configuration graphic 410a to indicate that a port transducer assembly and/or channel is active, to render configuration graphic 410b to indicate that a starboard transducer assembly and/or channel is active, and/or to render configuration graphic 410c to indicate that port and starboard transducer assemblies and/or channels are active. In some embodiments, user interface 120 may be configured to render beam indicator 412 and/or energized portion 416 to indicate transmission of an acoustic beam, for example, such as by animating those graphics by alternatingly rendering them with relatively high intensity and with relatively low intensity while a corresponding channel and/or transducer assembly is active. In various embodiments, such relatively high and relatively low intensities may be higher and/or the same intensity as used to render non-energized portion 418.

Figure 4C:
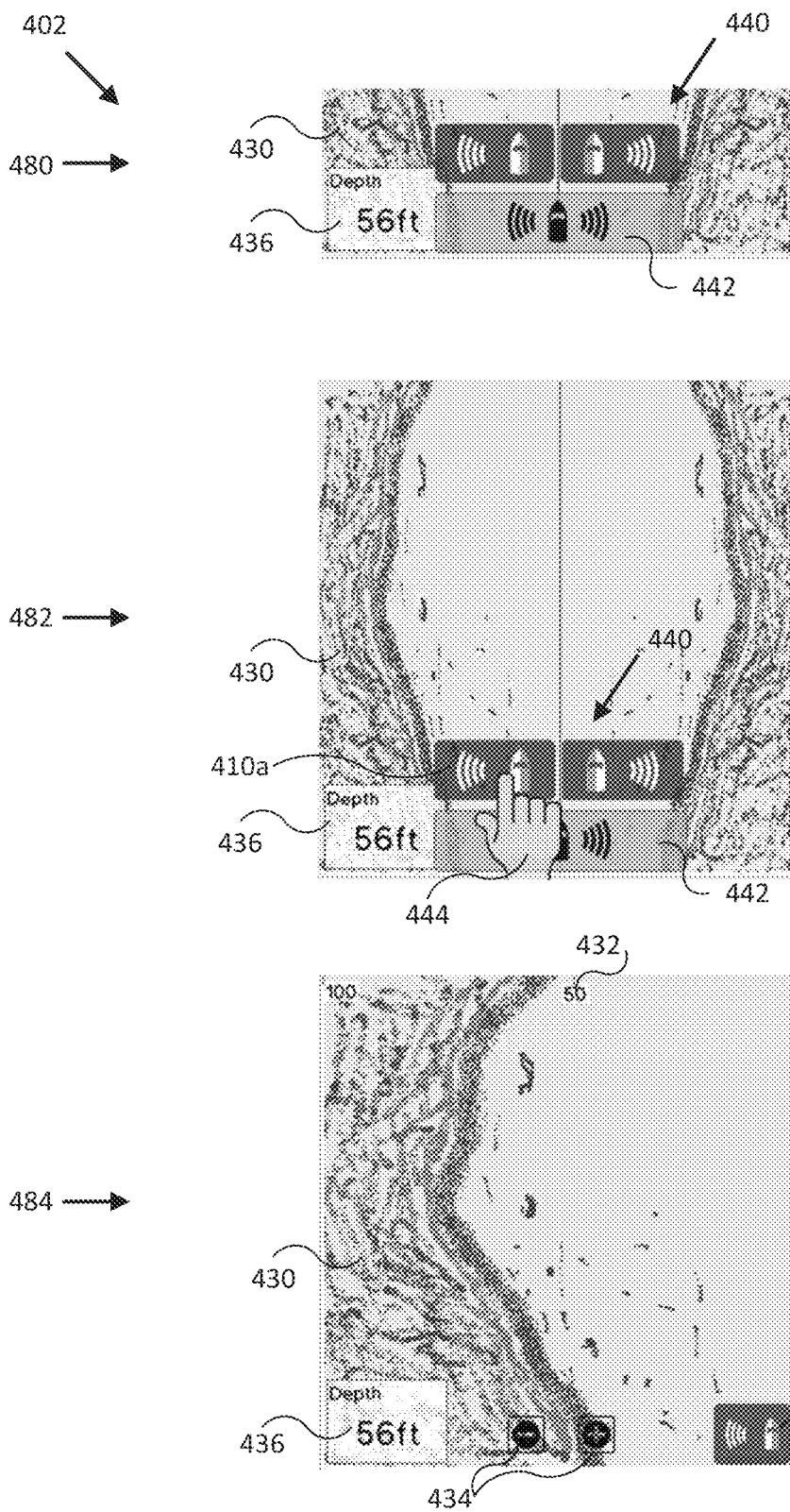
FIG. 4C illustrates sequential display views of a sonar user interface in accordance with an embodiment of the disclosure.

As described herein, in some embodiments, configuration graphic 410 (e.g. configuration graphics 410a, 410b, and/or 410c) may be adapted to provide for user selection of a corresponding configuration (e.g., a directional and/or coverage configuration) for sonar system 110. For example, FIG. 4C illustrates a flowchart 402 of sequential display views 480, 482, 484 of a sonar user interface in accordance with an embodiment of the disclosure. In the embodiment shown in FIG. 4C, flowchart 402 and display views 480, 482, 484 illustrate one method for selecting a configuration of sonar system 110 using configuration graphic 410.

Display view 480 includes selection graphic 440 overlaid on chart 430. Selection graphic 440 may include one or more configuration graphics configured to indicate available system configurations and/or an active configuration. For example, in the embodiment shown in display view 480, configuration graphic 442 is highlighted to indicate that port and starboard transducer assemblies and/or channels are active. In some embodiments, user interface 120 may be configured to display selection graphic 440 after a user has selected configuration graphic 410 in FIG. 4A (e.g., using a selector or user finger). Display view 482 is similar to display view 480, but additional illustrated a user selecting a configuration of sonar system 110 corresponding to a port transducer assembly and/or channel being active by selecting configuration graphic 410a of selection graphic 440 using selector 444. Display view 484 is the resulting display view after user selection of configuration graphic 410a, where configuration graphic 410a is displayed overlaid onto chart 430.

In some embodiments, user interface 120 may be configured to de-energize portions of sonar system 110 in response to user selection of a particular configuration using configuration graphic 410 and/or selection graphic 440. In other embodiments, user interface 120 may be configured to display sonar data and/or imagery corresponding to the selected configuration graphic and transducer assembly and/or channel (e.g., using a larger portion of the display) but continue to operate and record data from all or some portion of any remaining channels or transducer assemblies so as to allow instantaneous display view changes without loss of historical data.

Figure 5:
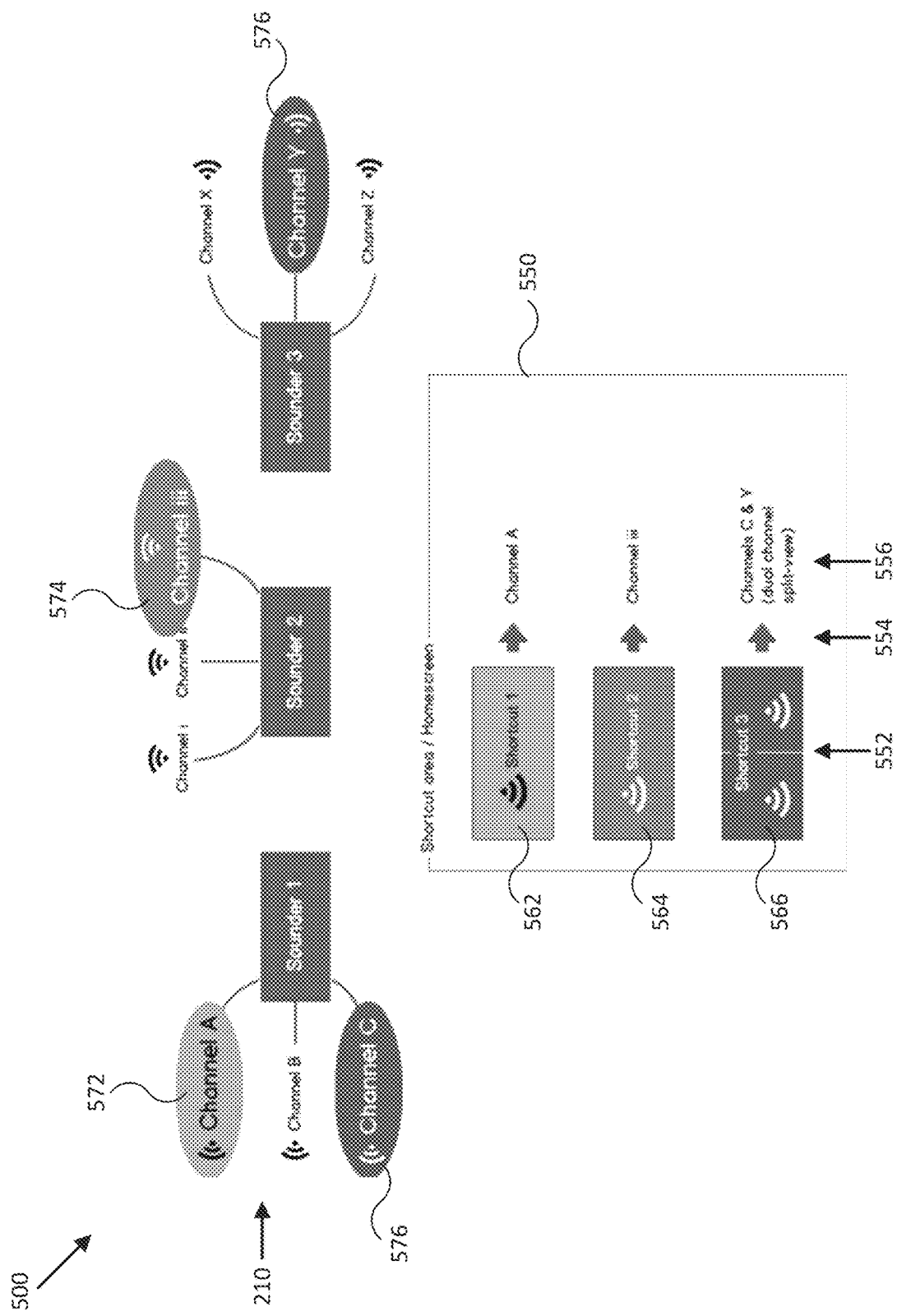
FIG. 5 illustrates a display view of a sonar user interface in accordance with an embodiment of the disclosure.

FIG. 5 illustrates display view 500 of a sonar user interface in accordance with an embodiment of the disclosure. In the embodiment shown in FIG. 5, display view 500 includes system graph 210 and shortcut window 550, where shortcut window 550 provides for user selection of system configurations including individual channel configurations from shortcut list 552. In some embodiments, display view 500 may include shortcut window 550 without system graph 210.

As shown in FIG. 5, shortcut window 550 may include one or more shortcuts 562, 564, 566, each linked to an item in configuration list 556 by one or more group indicators 554. Also shown are selector graphics 572, 574, 576 corresponding to shortcuts 562, 564, 566. Each of selector graphics 572, 574, 576 may be shaped, colored, and/or otherwise graphically linked to shortcuts 562, 564, 566, to indicate visually the corresponding system configuration. For example, as shown in FIG. 5, linked selector graphics and shortcuts may be rendered using a common color shared between the linked selector graphics and shortcuts.

In some embodiments, a shape, size, descriptive text, enumerator, and/or relative position of shortcuts 562, 564, 566 and/or a corresponding item in configuration list 556 may indicate that shortcut's relative orientation, width, shape, frequency, system id, channel and/or transducer assembly/sonar controller selection, and/or other associated configuration data. In various embodiments, each shortcut within shortcut window 550 may be user selectable by a user to select operation of system 110 according to the selected sonar controller, transducer assembly, channel, configuration, and/or group of sonar controllers, transducer assemblies, channels, and/or configurations. In further embodiments, shortcut window 550 may be implemented as a home page or default screen, for example, and may or may not include configuration list 556 and/or group indicators 554. For example, user interface 120 may be configured to render each shortcut within shortcut list 552 as individual icons is a general display view for a user interface directed to operation of mobile structure 101.

In some embodiments, user interface 120 may be configured to accept user input through system graph 210 (and/or tabbed window 230 of FIG. 2B) to select a system configuration, for example, and then accept user input to store the system configuration to a shortcut entry in shortcut list 552 of shortcut window 550. For example, user interface 120 may be configured to detect user input selecting a blank shortcut entry for a predetermined time period (e.g., holding the selection for 4-8 seconds) and then store the current system configuration to the blank shortcut entry. In other embodiments, once a particular shortcut is selected by a user, subsequent adjustments to the system configuration (e.g., selection of a different channel, transducer assembly, sonar controller, channel parameter, and/or other configuration data) may be automatically stored and/or associated with that shortcut. User interface 120 may be configured to implement the corresponding system configuration upon selection of the shortcut (e.g., shortcuts 562, 564, 566, in shortcut window 550) by the user. In various embodiments, a user can change configurations of a sonar system with one or many sonar controllers and/or transducer assemblies, each with one or more channels, substantially instantaneously during operation. In further embodiments, a system configuration may include selection and/or arrangement of sonar display views with additional non-sonar display views, such as display of an oceanographic chart, a radar chart, an engine monitoring display, a video display (e.g., associated with a camera mounted to mobile structure 101), various maritime display views, and/or other display views associated with operation of mobile structure 101.

Figure 6:
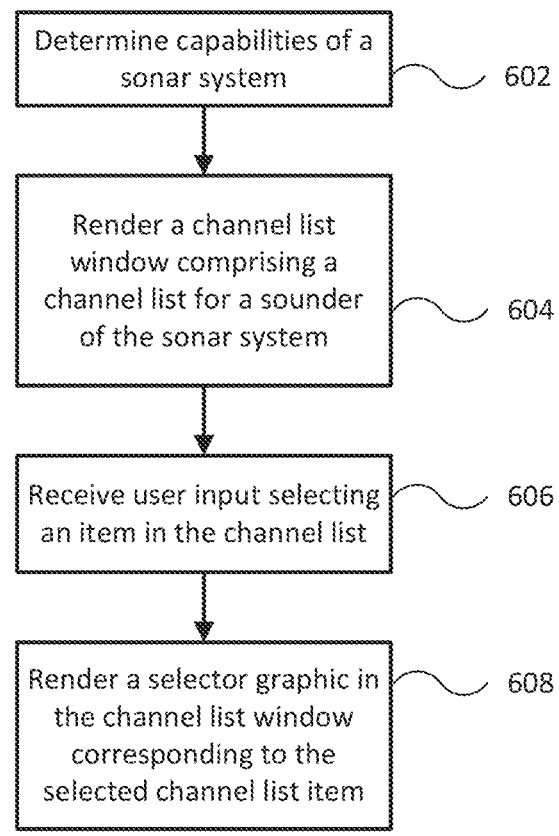
FIG. 6 illustrates a flow diagram of various operations to provide a sonar user interface in accordance with an embodiment of the disclosure.

FIG. 6 illustrates a flow diagram of process 600 to provide a sonar user interface sonar system 110 of mobile structure 101 in accordance with an embodiment of the disclosure. In some embodiments, the operations of FIG. 6 may be implemented as software instructions executed by one or more logic devices associated with corresponding electronic devices, sensors, and/or structures depicted in FIGS. 1A-B. More generally, the operations of FIG. 6 may be implemented with any combination of software instructions and/or electronic hardware (e.g., inductors, capacitors, amplifiers, actuators, or other analog and/or digital components).

It should be appreciated that any step, sub-step, sub-process, or block of process 600 may be performed in an order or arrangement different from the embodiments illustrated by FIG. 6. For example, in other embodiments, one or more blocks may be omitted, and other blocks may be included. Furthermore, block inputs, block outputs, various sensor signals, sensor information, calibration parameters, and/or other operational parameters may be stored to one or more memories prior to moving to a following portion of a corresponding process. Although process 600 is described with reference to systems 100 and/or 100B and/or display views in FIGS. 2A-5, process 600 may be performed by other systems different from those systems and display views different from those views, including a different selection of electronic devices, sensors, assemblies, mobile structures, mobile structure attributes, user interfaces, graphics, and/or graphics attributes.

Process 600 represents a method for providing a sonar user interface for sonar system 110 of mobile structure 101 using systems 100 and/or 100B in accordance with embodiments of the disclosure. At the initiation of process 600, various system parameters may be populated by prior execution of a process similar to process 600, for example, or may be initialized to zero and/or one or more values corresponding to typical, stored, and/or learned values derived from past operation of process 600, as described herein.

In block 602, a logic device determines capabilities of a sonar system. For example, user interface 120 and/or controller 130 of system 100 may be configured to receive user input indicating a selection of sonar controllers, transducer assemblies, channels, orientations and/or ranges, frequency ranges, and/or other sonar system characteristics and/or capabilities. Upon receipt of such sonar system characteristics, user interface 120 and/or controller 130 may be configured to generate and/or render channel lists, system graphs, tabbed windows, and/or other components and/or data corresponding to the various display views described herein. In other embodiments, user interface 120 and/or controller 130 may be implemented with memory including manufacturer's data indicating the sonar system characteristics and/or capabilities. In further embodiments, user interface 120 and/or controller 130 may be configured to request such information from each sonar controller and/or transducer assembly in communication with user interface 120 and/or controller 130, such as through a network or other type of communication link, and generate the various components and/or data corresponding to the various display views described herein.

In block 604, a logic device renders a channel list window comprising a channel list for a sounder of the sonar system. For example, user interface 120 and/or controller 130 may be configured to render channel list window 310 comprising channel list 312 for transducer assembly 112 (e.g., and/or for sonar controller 130), where channel list 312 is generated from data determined in block 602. In some embodiments, user interface 120 and/or controller 130 may be configured to render channel list window 310 as a tab of tabbed window 230, for example. In other embodiments, user interface 120 and/or controller 130 may also be configured to render system graph 210 from data determined in block 602, as described herein.

In block 606, a logic device receives user input selecting an item in the channel list. For example, user interface 120 and/or controller 130 may be configured to receive user input from a joystick, keyboard, mouse, touch screen, and/or other device of user interface 120, where the user input comprises selection of an item in channel list 312. In some embodiments, user interface 120 and/or controller 130 may be configured to receive user input selecting a tab of tabbed window 230 prior to receiving selection of an item in channel list 312. In other embodiments, user interface 120 and/or controller 130 may be configured to receive user input selecting an item in a channel list graphic of a rendered system graph (e.g., channel list graphic 222 of system graph 210).

In block 608, a logic device renders a selector graphic in the channel list window corresponding to the selected channel list item. For example, user interface 120 and/or controller 130 may be configured to render selector graphic 314 in channel list window 310, where selector graphic 314 is configured to indicate a channel of transducer assembly 112 (e.g., and/or sonar controller 130) for operation and/or for further configuration by a sonar user interface according to embodiments of the disclosure. In some embodiments, the selected channel may be enabled for transmission of acoustic beams and reception of acoustic returns, and system 100 may be configured to convert the acoustic returns into sonar data and/or imagery for display to a user. Such sonar data and/or imagery may also be used to adjust various operational systems of mobile structure 101, including to autopilot the mobile structure.

It is contemplated that any one or combination of methods to provide a sonar user interface, sonar data and/or imagery may be performed according to one or more operating contexts of a control loop, for example, such as a startup, learning, running, and/or other type operating context. For example, process 600 may proceed back to block 602 and proceed through process 600 again to produce updated sonar user interface display views, sonar data, and/or imagery, as in a control loop.

Embodiments of the present disclosure can thus provide an intuitive sonar user interface and facilitate operation of sonar systems and generation and display of sonar data and/or imagery. Such embodiments may be used to provide sonar data to assist in navigation and/or mapping for a mobile structure and/or to assist in the operation of other systems, devices, and/or sensors coupled to the mobile structure.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system comprising:
a logic device configured to receive one or more sensor signals and render a sonar user interface for a sonar system coupled to a mobile structure, wherein the logic device is adapted to:
render a channel list window comprising a channel list for a sounder of the sonar system, wherein the sounder comprises a plurality of channels identified in the channel list, available through the channel list window for operation comprising at least one of activating and/or deactivating one or more of the identified channels and configuration of one or more of the identified channels comprising user adjustment of a corresponding channel parameter;
receive user input selecting an item in the channel list for at least one of operation by the sounder and/or configuration of the selected channel list item; and
render a selector graphic in the channel list window corresponding to the selected channel list item, wherein the selector graphic is configured to indicate one of the plurality of channels of the sounder for at least one of operation and/or configuration by the sonar user interface;
wherein in response to user input selecting the item in the channel list for configuration of the selected channel list item, the logic device is further adapted to:
render a parameter window linked to the selected channel list item in the channel list window by a dialog indicator, wherein the parameter window comprises a channel parameter list for the indicated channel of the sounder;
receive user input selecting a channel parameter in the channel parameter list for user adjustment;
receive user input adjusting the channel parameter; and
store a current configuration for the indicated channel including the adjusted channel parameter.

2. The system of claim 1, wherein the logic device is adapted to:
render a channel list menu corresponding to the selected channel list item, wherein the channel list menu comprises an action list comprising at least one of a new item action, a delete item action, an edit item action, and/or a copy item action; and
receive user input selecting an action from the action list parameter in the parameter list for user adjustment.

3. The system of claim 1, wherein the sounder of the sonar system is one of a plurality of sounders for the sonar system, and wherein the logic device is adapted to:
render the channel list window as a group within a hierarchical selection interface, wherein the hierarchical selection interface comprises a plurality of groups corresponding to the plurality of sounders of the sonar system, and wherein each group is rendered in a window selectable by the user;

receive user input selecting the group prior to receiving the user input selecting the channel list item; and render a chart comprising at least one of sonar data and/or imagery corresponding to the selected channel list item after receiving the user input selecting the channel list item.

4. The system of claim 1, wherein the logic device is adapted to:

render a system graph of the sonar system, wherein the system graph comprises a sounder graphic corresponding to the sounder and a channel list graphic corresponding to the channel list; and render a selector graphic in the system graph corresponding to the selected channel list item.

5. The system of claim 1, wherein the logic device is adapted to:

render a shortcut window, wherein the shortcut window comprises a shortcut list corresponding to one or more system configurations for the sonar system;

receive user input selecting a shortcut in the shortcut list; and configure the sonar system according to one of the one or more system configurations corresponding to the selected shortcut.

6. The system of claim 5, wherein the shortcut list comprises a blank shortcut entry, and wherein the logic device is adapted to:

detect user input selecting the blank shortcut entry for a predetermined time period in the shortcut list; and store a current system configuration for the sonar system in the blank shortcut entry.

7. The system of claim 1, wherein the logic device is adapted to:

render a chart of at least one of sensor data and/or imagery of an environment local to the mobile structure; and render a configuration graphic overlaid on the chart, wherein the configuration graphic is configured to indicate an active system configuration for the sonar system graphically to a user.

8. The system of claim 7, further comprising a user interface comprising a touch screen display, wherein the mobile structure is a watercraft, and wherein the logic device is adapted to:

receive user input selecting the configuration graphic;

render a selection graphic overlaid on the chart, wherein the selection graphic comprises one or more configuration graphics configured to indicate a corresponding at least one or more available system configurations and/or the active system configuration of the sonar system;

receive user input selecting one of the one or more configuration graphics; and configure the sonar system according to the selected one of the one or more configuration graphics.

9. The system of claim 7, wherein the logic device is adapted to render a chart header for the chart, and wherein the chart header comprises at least one of a sounder indicator, a channel indicator, and/or a vessel indicator.

10. A method comprising:

rendering a channel list window comprising a channel list for a sounder of a sonar system, wherein the sounder comprises a plurality of channels identified in the channel list, available through the channel list window for operation comprising at least one of activating and/or deactivating one or more of the identified channels and configuration of one or more of the identified channels comprising user adjustment of corresponding channel parameter;

receiving user input selecting an item in the channel list for at least one of operation and/or configuration of the selected channel list item;

rendering a selector graphic in the channel list window corresponding to the selected channel list item, wherein the selector graphic is configured to indicate one of the plurality of channels of the sounder for at least one of operation and/or configuration by a sonar user interface;

rendering, in response to user input selecting the item in the channel list for configuration of the selected channel list item, a parameter window linked to the selected channel list item in the channel list window by a dialog indicator, wherein the parameter window comprises a channel parameter list for the indicated channel of the sounder;

receiving user input selecting a channel parameter in the channel parameter list for user adjustment;

receiving user input adjusting the channel parameter; and storing a current configuration for the indicated channel including the adjusted channel parameter.

11. The method of claim 10, further comprising:

rendering a channel list menu corresponding to the selected channel list item, wherein the channel list menu comprises an action list comprising at least one of a new item action, a delete item action, an edit item action, and/or a copy item action; and receiving user input selecting an action from the action list parameter in the parameter list for user adjustment.

12. The method of claim 10, wherein the sounder of the sonar system is one of a plurality of sounders for the sonar system, the method further comprising:

rendering the channel list window as a group within a hierarchical selection interface, wherein the hierarchical selection interface comprises a plurality of groups corresponding to the plurality of sounders of the sonar system, wherein each group is rendered in a window selectable by the user;

receiving user input selecting the group prior to receiving the user input selecting the channel list item; and rendering a chart comprising at least one of sonar data and/or imagery corresponding to the selected channel list item after receiving the user input selecting the channel list item.

13. The method of claim 10, further comprising:

rendering a system graph of the sonar system, wherein the system graph comprises a sounder graphic corresponding to the sounder and a channel list graphic corresponding to the channel list; and rendering a selector graphic in the system graph corresponding to the selected channel list item.

14. The method of claim 10, further comprising:

rendering a shortcut window, wherein the shortcut window comprises a shortcut list corresponding to one or more system configurations for the sonar system;

receiving user input selecting a shortcut in the shortcut list; and configuring the sonar system according to one of the one or more system configurations corresponding to the selected shortcut.

15. The method of claim 14, wherein the shortcut list comprises a blank shortcut entry, the method further comprising:

detecting user input selecting the blank shortcut entry for a predetermined time period in the shortcut list; and storing a current system configuration for the sonar system in the blank shortcut entry.

16. The method of claim 10, further comprising:

rendering a chart of at least one of sensor data and/or imagery of an environment local to a mobile structure; and rendering a configuration graphic overlaid on the chart, wherein the configuration graphic is configured to indicate an active system configuration for the sonar system graphically to a user.

17. The method of claim 16, further comprising:

receiving user input selecting the configuration graphic;

rendering a selection graphic overlaid on the chart, wherein the selection graphic comprises one or more configuration graphics configured to indicate a corresponding at least one or more available system configurations and/or the active system configuration of the sonar system;

receiving user input selecting one of the one or more configuration graphics; and configuring the sonar system according to the selected one of the one or more configuration graphics.

18. The method of claim 16, further comprising rendering a chart header for the chart, wherein the chart header comprises at least one of a sounder indicator, a channel indicator, and/or a vessel indicator.

* * * * *